(12) United States Patent
Cummings

(10) Patent No.: US 9,729,062 B2
(45) Date of Patent: Aug. 8, 2017

(54) ISOLATED FLYBACK CONVERTER

(71) Applicant: MAXOUT RENEWABLES, INC., Livermore, CA (US)

(72) Inventor: Eric Bryant Cummings, Livermore, CA (US)

(73) Assignee: Maxout Renewables, Inc., Livermore, CA (US)

( * ) Notice: Subject to any disclaimer, the term of this patent is extended or adjusted under 35 U.S.C. 154(b) by 88 days.

(21) Appl. No.: 14/435,716

(22) PCT Filed: Oct. 14, 2013

(86) PCT No.: PCT/US2013/064836
§ 371 (c)(1),
(2) Date: Apr. 14, 2015

(87) PCT Pub. No.: WO2014/062569
PCT Pub. Date: Apr. 24, 2014

(65) Prior Publication Data
US 2015/0249389 A1    Sep. 3, 2015

Related U.S. Application Data

(60) Provisional application No. 61/713,938, filed on Oct. 15, 2012.

(51) Int. Cl.
*H02M 3/335*      (2006.01)
*H02M 1/32*       (2007.01)
(Continued)

(52) U.S. Cl.
CPC ....... *H02M 3/33507* (2013.01); *H02M 3/335* (2013.01); *H02M 1/32* (2013.01); *H02M 1/44* (2013.01); *H02M 2001/348* (2013.01)

(58) Field of Classification Search
CPC ......... H02M 3/33523; H02M 3/33553; H02M 3/33507; H02M 3/335; H02M 3/24;
(Continued)

(56) References Cited

U.S. PATENT DOCUMENTS 5,006,822 A    4/1991 Reddy
9,106,105 B2 *  8/2015 McCaslin ............... H02J 3/385
(Continued)

FOREIGN PATENT DOCUMENTS

JP        08294275       11/1996
JP        2010016938      1/2010

OTHER PUBLICATIONS

International Search Report for application PCT/US2013/064836 dated Oct. 14, 2013.
(Continued)

*Primary Examiner* — Gustavo Rosario Benitez
(74) *Attorney, Agent, or Firm* — Kilpatrick Townsend & Stockton LLP

(57) ABSTRACT

A flyback converter has a sub-nanofarad capacitor disposed between the primary winding and the secondary winding of a transformer included in the flyback converter. A controller in the flyback converter co-optimizes the switch period and width such that the flyback converter operates substantially at peak efficiency via the use of a novel set point and control-signal. A model of global optimal control is provided via a novel characterization and analysis method.

18 Claims, 18 Drawing Sheets

(51) Int. Cl.
*H02M 1/44* (2007.01)
*H02M 1/34* (2007.01)

(58) Field of Classification Search
CPC ........ H02M 3/04; H02M 3/156; H02M 3/158; H02M 1/08; H02M 1/44; H02M 2001/348
See application file for complete search history.

(56) References Cited

U.S. PATENT DOCUMENTS

| | | | |
|---|---|---|---|
| 9,342,088 B2* | 5/2016 | Batten | G05F 1/67 |
| 2007/0047269 A1 | 3/2007 | Hachiya et al. | |
| 2007/0171585 A1 | 7/2007 | Sicong et al. | |
| 2007/0216385 A1 | 9/2007 | Quazi | |
| 2009/0179619 A1* | 7/2009 | Houston | H02M 3/156 |
| | | | 323/212 |
| 2009/0309557 A1* | 12/2009 | Miyamae | H02M 3/156 |
| | | | 323/234 |
| 2010/0026208 A1* | 2/2010 | Shteynberg | H05B 33/0815 |
| | | | 315/297 |
| 2010/0202160 A1 | 8/2010 | Kim et al. | |
| 2011/0109293 A1* | 5/2011 | Schwerman | G05D 23/19 |
| | | | 323/284 |
| 2012/0063173 A1 | 3/2012 | Fu et al. | |
| 2012/0200331 A1* | 8/2012 | Karlsson | H02M 3/156 |
| | | | 327/175 |
| 2013/0027978 A1* | 1/2013 | Suzuki | H02M 3/33507 |
| | | | 363/15 |
| 2013/0188399 A1* | 7/2013 | Tang | H02M 3/335 |
| | | | 363/21.1 |
| 2013/0294118 A1* | 11/2013 | So | H02M 3/33507 |
| | | | 363/21.16 |

OTHER PUBLICATIONS

EP13846274.2, "Partial Supplementary European Search Report", dated Mar. 3, 2017, 6 pages.

* cited by examiner

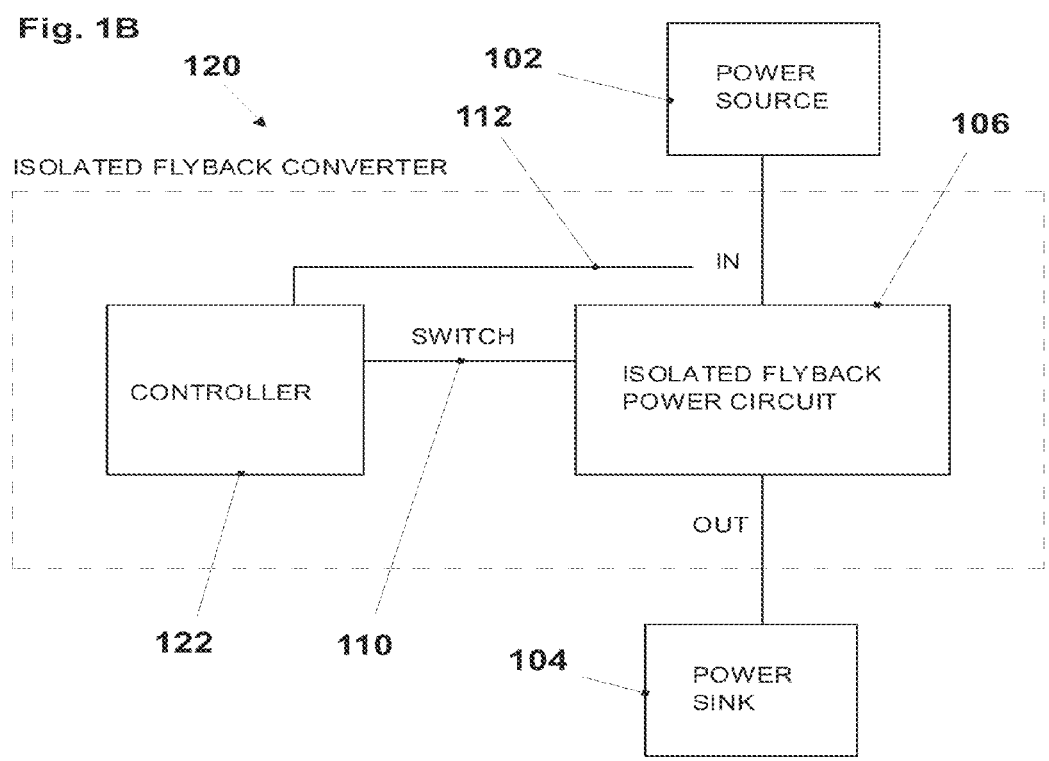

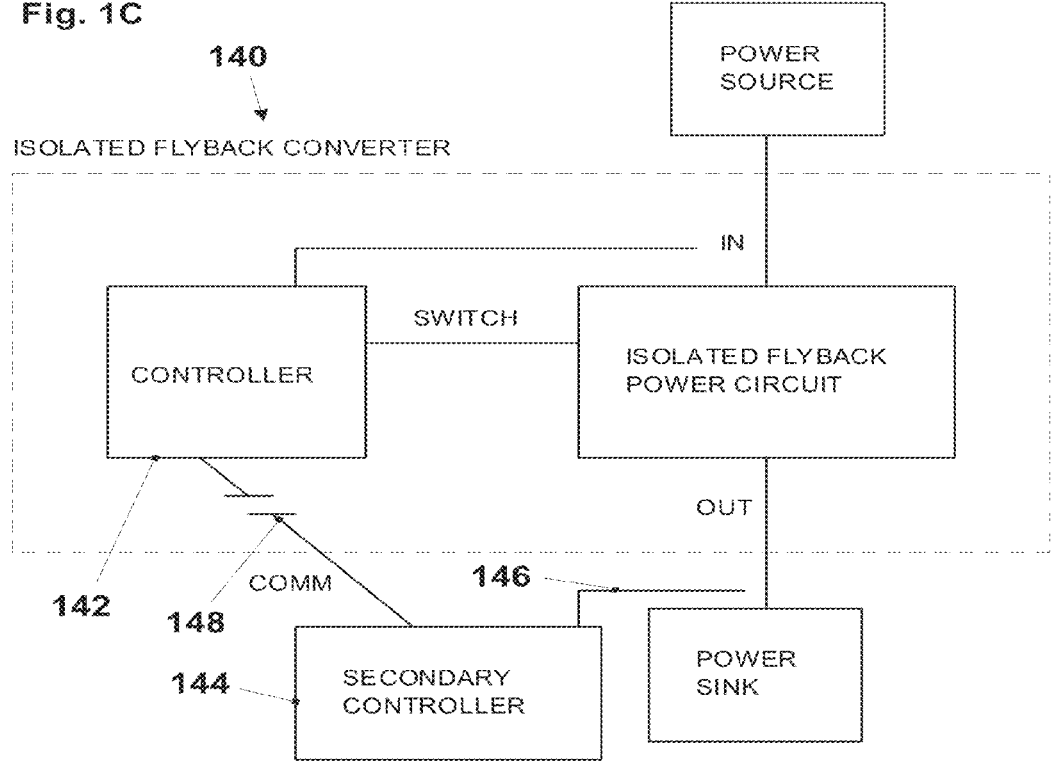

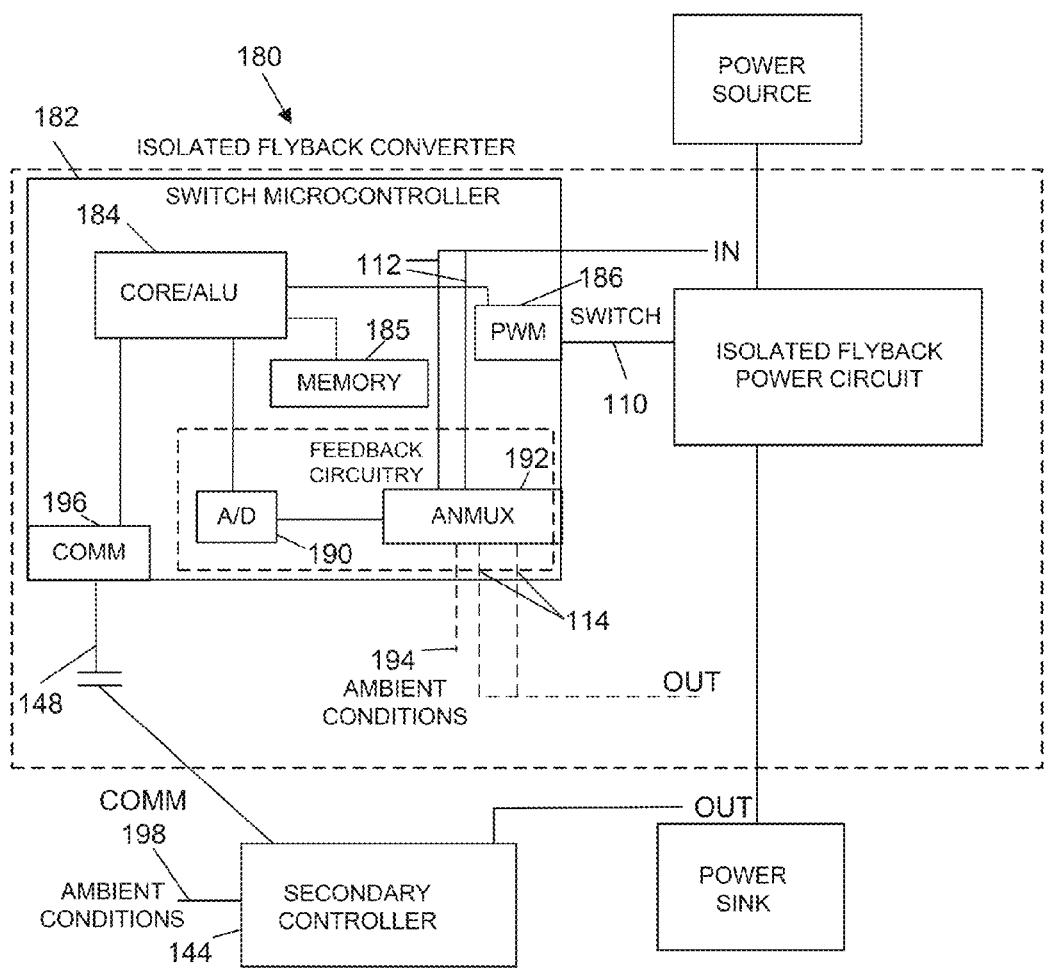

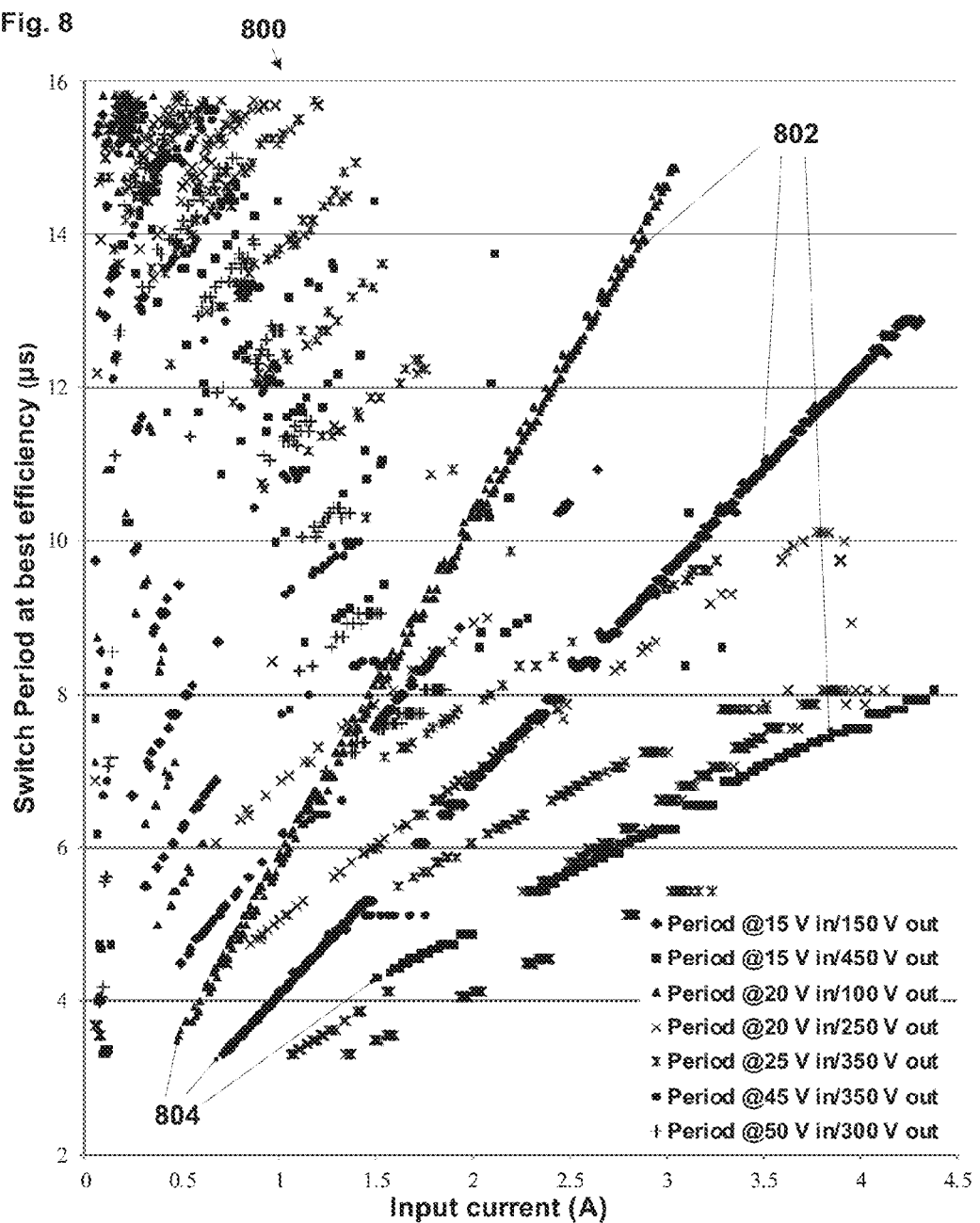

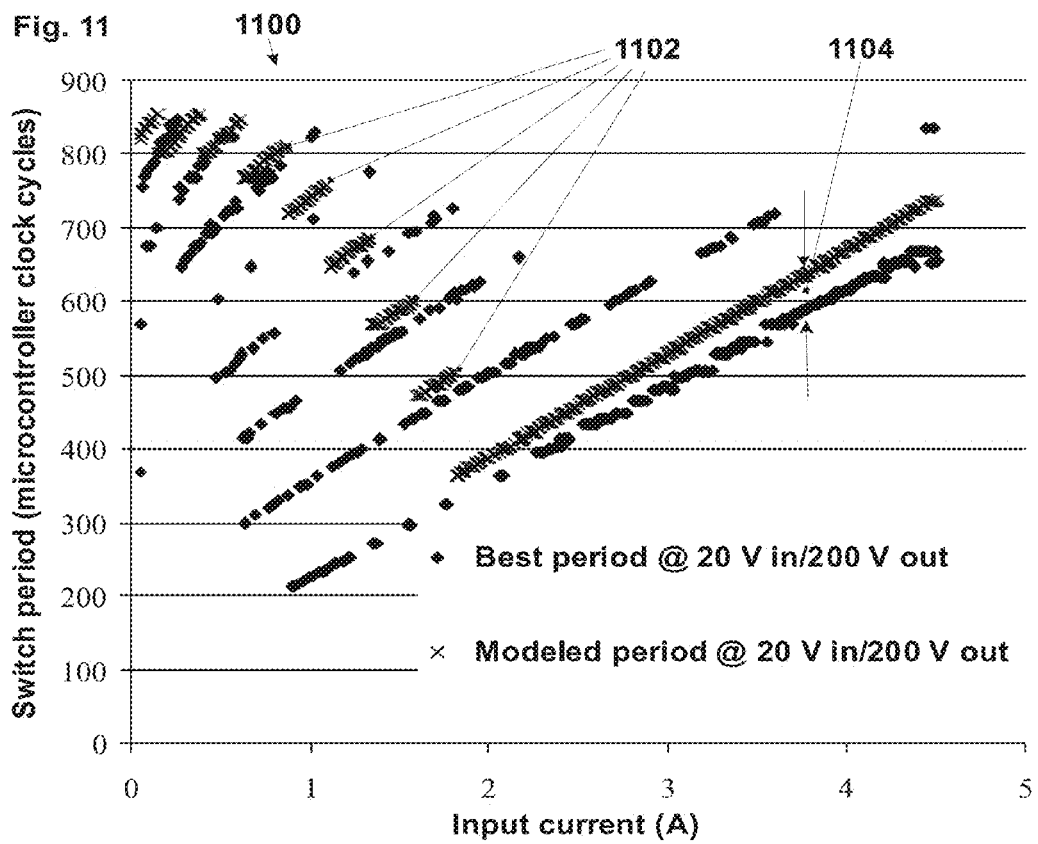
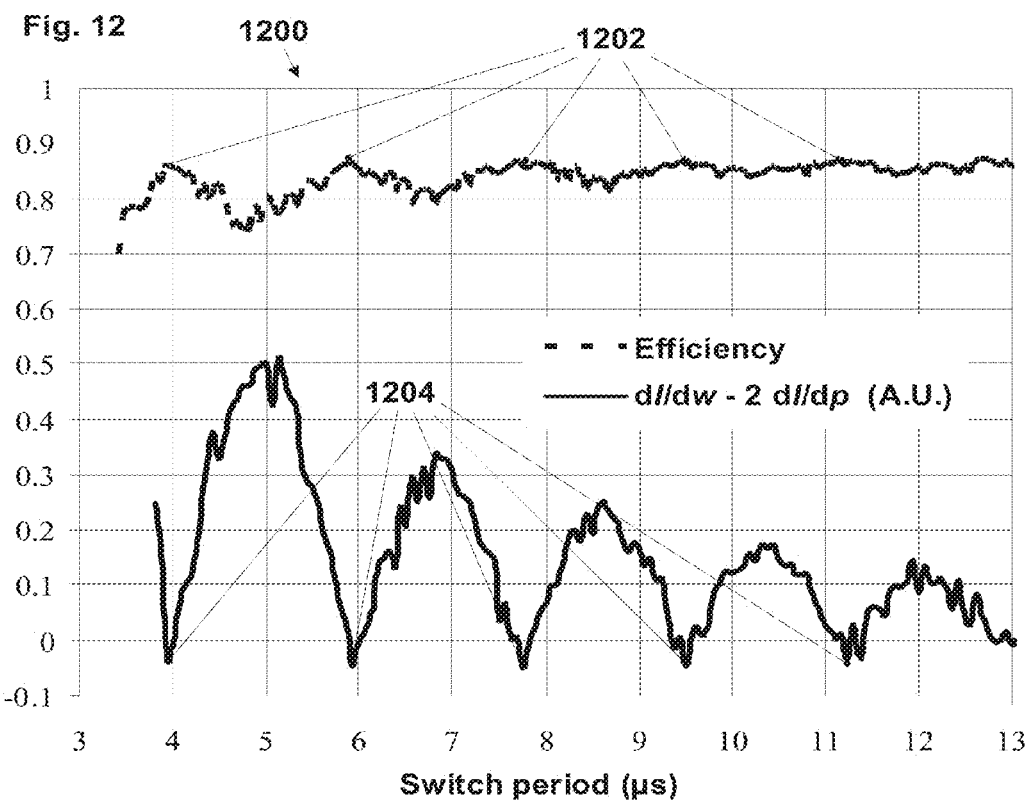

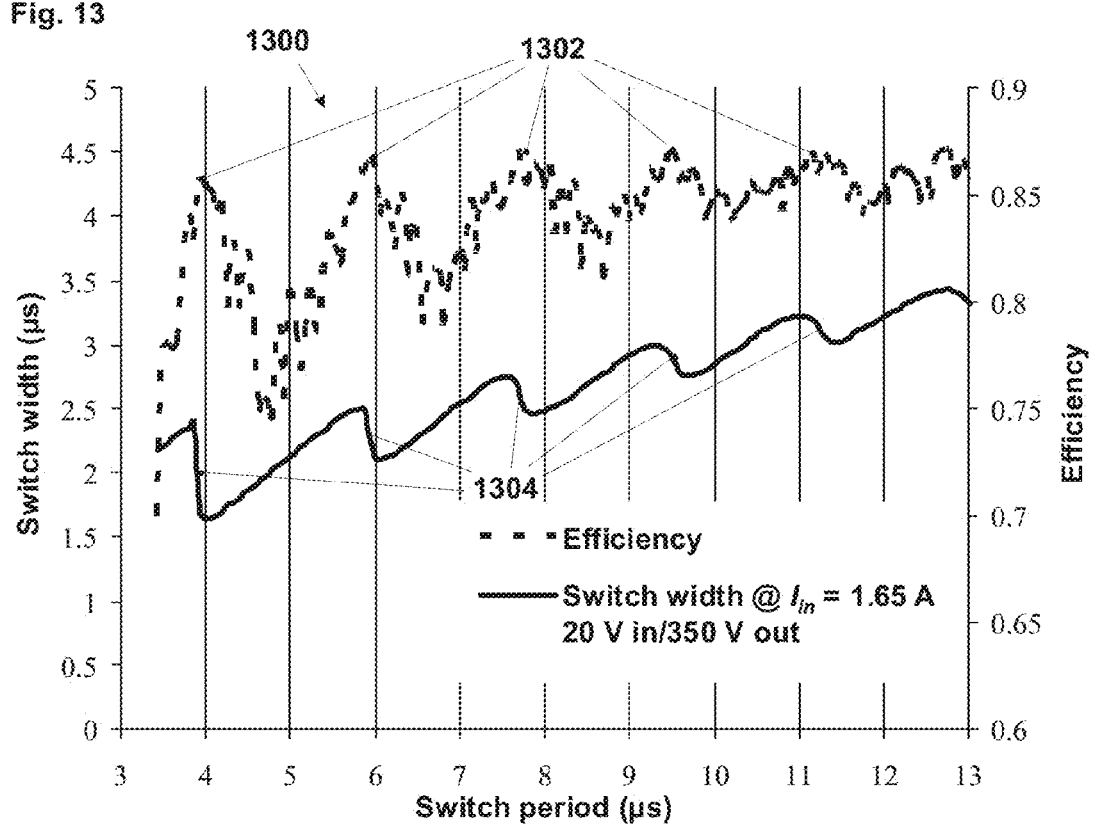

$I_{in} = 0.1$ A
$V_{in} = 20$ V
$V_{out} = 200$ V $I_{in} = 0.2$ A
$V_{in} = 20$ V
$V_{out} = 200$ V $I_{in} = 0.5$ A
$V_{in} = 20$ V
$V_{out} = 200$ V $I_{in} = 1.0$ A
$V_{in} = 20$ V
$V_{out} = 200$ V

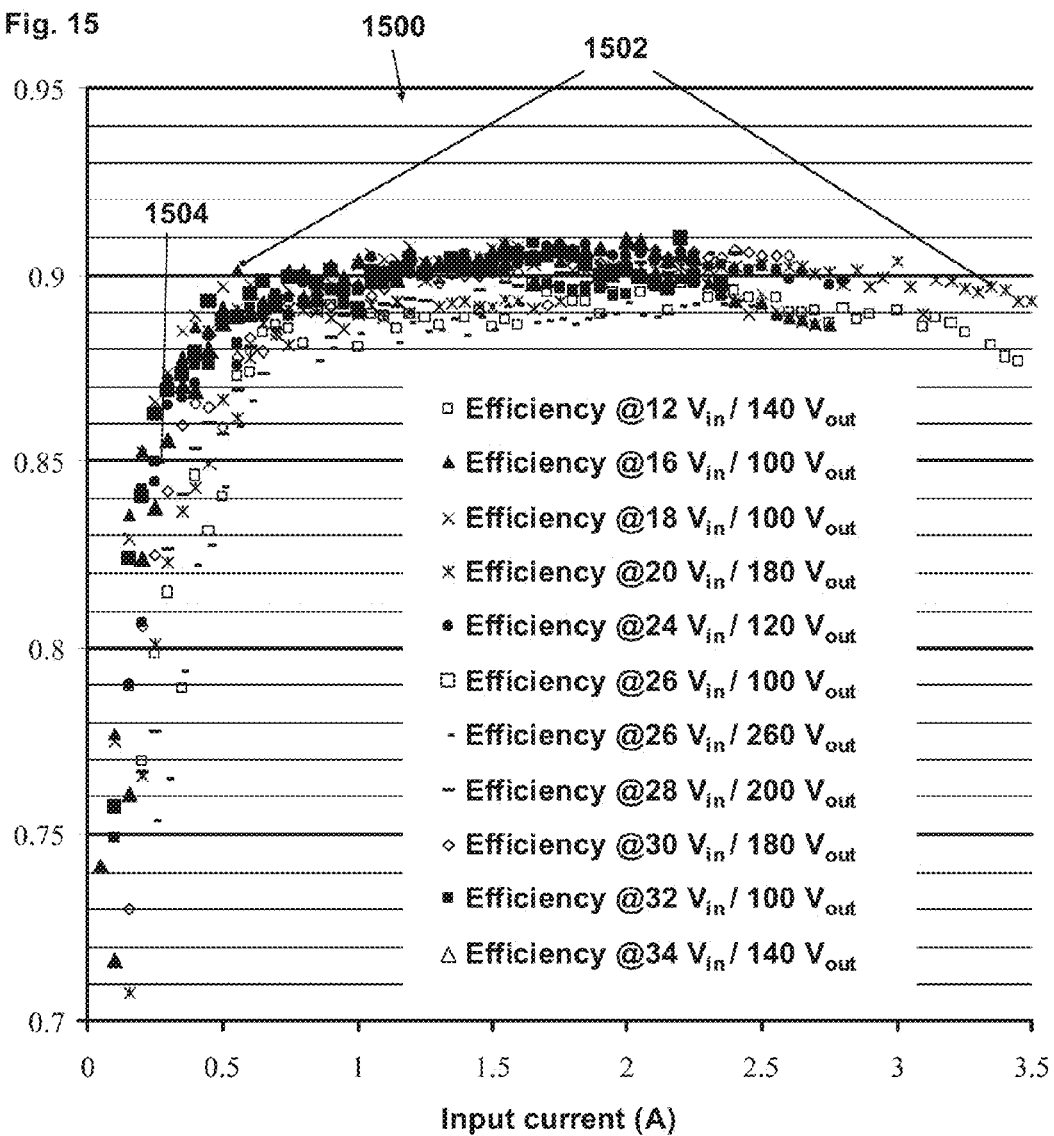

ISOLATED FLYBACK CONVERTER

CROSS REFERENCE TO RELATED APPLICATIONS

This application is a 371 National Stage entry of PCT/US2013/064836 filed Oct. 14, 2013, which claims the benefit of U.S. Provisional Application No. 61/713,938 filed Oct. 15, 2012, which are hereby incorporated by reference for all purposes.

BACKGROUND

Power converters are ubiquitous in modern electronics, appliances, devices, computers, vehicles, and are an especially important part of renewable energy. A power converter is used to convert the voltage or current from a source of electricity to a voltage or current having different characteristics. For example, the power converter may convert an incoming voltage to a lower voltage, to a higher voltage, to a different voltage reference point, may converted AC to DC, DC to AC, etc. Most modern power regulators are of the "switching" type, in which a semiconductor switch periodically applies and interrupts a flow of electricity through the converter. In many such devices, the efficiency of the converter depends on the control-algorithm for operating the switch. For simplicity, conventional power converters employ a fixed switch period. The width or duty cycle of the switch operation is controlled to establish the converter characteristic.

Conventional converters perform poorly at low power because the required switch duty cycles are excessively short. To alleviate this problem, some advanced controllers use a "pulse-skipping" algorithm in which the switch period is increased in discrete multiples. Other converters operate with substantially constant switch duration and a variable switch frequency, which have efficiency problems at high power. Some conventional power converters switch between various modes of operation depending on the magnitude of the load.

SUMMARY

Embodiments of the present invention are generally related to power converters. Specifically, some embodiments of the present invention provide techniques for switch control and design of an isolated flyback converter which extends the efficient operating envelope and maximizes efficiency throughout the envelope. Some embodiments of the present invention provide a method to develop optimal switch algorithms for a more general class of power converters, e.g., buck, boost, buck/boost, flyback, SEPIC, Cuk, resonant, soft-switching, etc. In some embodiments, both the frequency and duration of the switch operation are optimized for the source and load characteristics to realize the highest level of efficiency supported by the hardware. In some embodiments, such switching algorithms result in reduced circuit stresses, soft switching, reduced electromagnetic emissions, in addition to improved efficiency. Embodiments of the present invention provide ways to reduce the cost of a converter to achieve target efficiency or operating envelope. In other embodiments, techniques are provided that can increase the power efficiency and operating envelope of a given converter without a substantial increase in cost.

The following detailed description, together with the accompanying drawings will provide a better understanding of the nature and advantages of the embodiments of the present invention.

BRIEF DESCRIPTION OF THE DRAWINGS

FIG. 1B is a block diagram of a flyback converter having a controller that senses only input-side parameters according to an embodiment of the present invention.

FIG. 1C is a block diagram of a flyback converter having a controller that senses input-side parameters and receives output-side parameter information across a communication channel according to an embodiment of the present invention.

FIG. 1E is a block diagram of a flyback converter according to another embodiment of the present invention.

FIG. 8 shows an overlay of optimal switch periods vs. input current at different input and output voltages according to an embodiment of the present invention.

FIG. 11 shows a comparison of optimum period modeled in a controller with measured results according to an embodiment of the present invention.

FIG. 12 shows a control signal comprising a finite difference derivative of current with respect to a perturbation in switch width and period and the correspondence of sharp minima with efficiency peaks, according to an embodiment of the present invention.

FIG. 13 shows the variation of switch width and period at constant input current and the corresponding variation of efficiency according to an embodiment of the present invention.

FIG. 15 shows an overlay of efficiency measurements vs. input current of a converter over a range of input and output voltages according to an embodiment of the present invention.

DETAILED DESCRIPTION

Isolated flyback converters may be useful in a wide range of applications because of their relative low cost, ability to step up or down via changing the winding ratio on the flyback transformer, and the ability to boost and buck from this step-up/step-down point. Embodiments of the present invention provide a method to control the flyback switch period and on-time, or width, to maximize efficiency for a given set of hardware. Some embodiments of the present invention provide self-protection calculations that may be employed to limit operation of a flyback converter to a safe working envelope. Another embodiment of the present invention provides an apparatus to implement a flyback switch control.

In some embodiments, a method to develop the switch control scheme for a given hardware configuration is provided. Advantages of applying an embodiment of the present invention may include reduction of voltage and current stresses and thermal loads, the reduction of electromagnetic emissions (EMI/RFI), the maximization of efficiency over the operating envelope, and a substantial extension of the operating envelope of input and output voltages and currents.

Figure 1A:
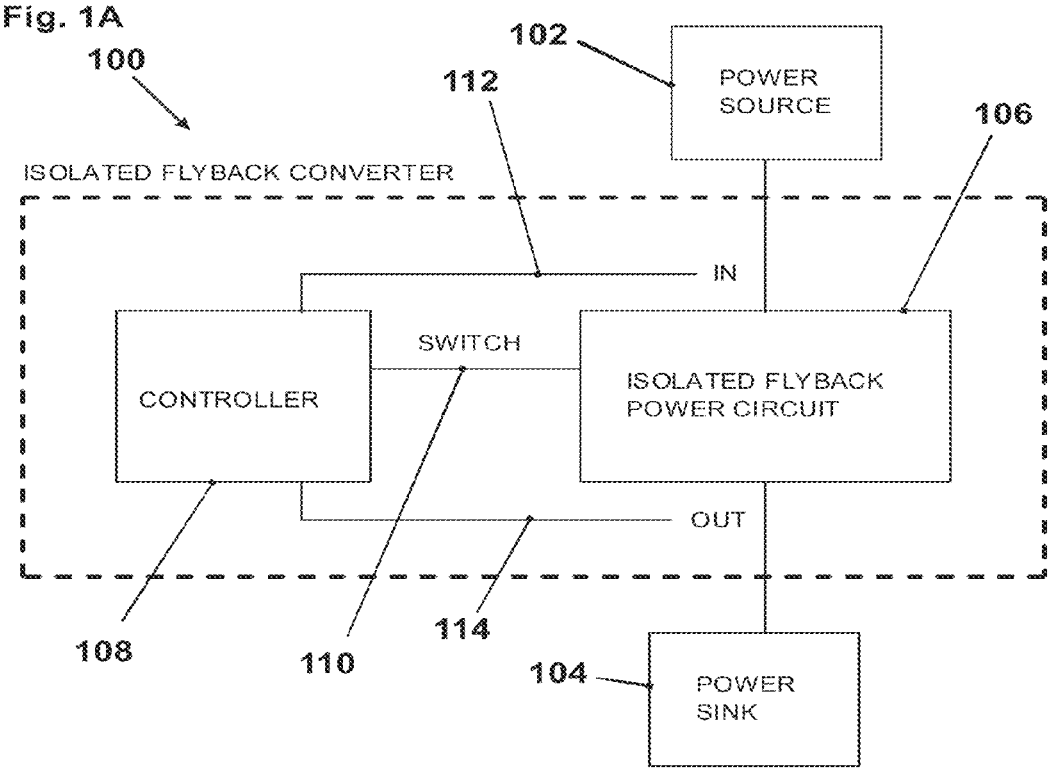
FIG. 1A illustrates a block diagram of a flyback converter having a controller that senses input and output parameters according to an embodiment of the present invention.

Flyback converters are used in a wide variety of electronic equipment. FIG. 1A shows a block diagram of a converter 100 that processes power from a source 102 to a power sink 104. Converter 100 includes a power circuit 106 and a controller 108. Controller 108 produces at least one switch-control signal 110, e.g., as a train of voltage or current pulses. Some embodiments of the present invention utilize measurements of input characteristics 112, e.g., input voltage or input current, and measurements of output characteristics 114 e.g., output voltage or output current, in open loop calculations of switch timing and closed-loop adjustments of switch timing.

FIG. 1B shows a converter 120 according to another embodiment of the present invention. Controller 120 includes an advanced controller 122 that utilizes only measurements taken on the input side to control switch timing. Controller 122 may infer output characteristics, e.g., output voltage, from their effect on characteristics of the input, e.g., histories or waveforms of voltage and current across at least one internal component, e.g., a switch, a transformer, an inductor, a resistor, or a capacitor, input voltage or current variation with switch period and or width, etc. Because analog sensing circuitry can increase the cost and complexity of a converter, an objective of this invention is to minimize this circuitry and its cost while not compromising control and efficiency. Controller 122 utilizes only output characteristics rather than input characteristics.

FIG. 1C shows a converter 140 according to yet another embodiment of the present invention. Convertor 140 includes a controller 142 and a secondary controller 144. Secondary controller 144 may sense at least one output characteristic 146, e.g., output voltage, and report this information using a communication channel 148 to controller 140. As used herein, communication channel 148 may comprise an isolated or non-isolated circuit. Communication channel 148 may convey data in a digital or analog encoding. Transmission may be asynchronous, synchronous transmission, I²C, SPI, one-wire, two-wire, etc. Physical hardware for communication channel 148 may comprise a direct connection, AC-coupled circuit, differential circuit, current-loop, radio-frequency link, etc. Data encoding for communication channel 148 may be analog voltage or current, pulse-width modulation (PWM), amplitude modulation (AM), frequency modulation, phase modulation (PM), return-to-zero (RZ), non-return-to-zero (NRZ), inverted non-return-to-zero (NRZI), enhanced non-return-to-zero (ENRZ), Manchester encoding, and the like as is known by one skilled in the art. In some embodiments, secondary controller 144 may be external to converter 140. In other embodiments, secondary controller 144 may be part of converter 140.

Figure 1D:
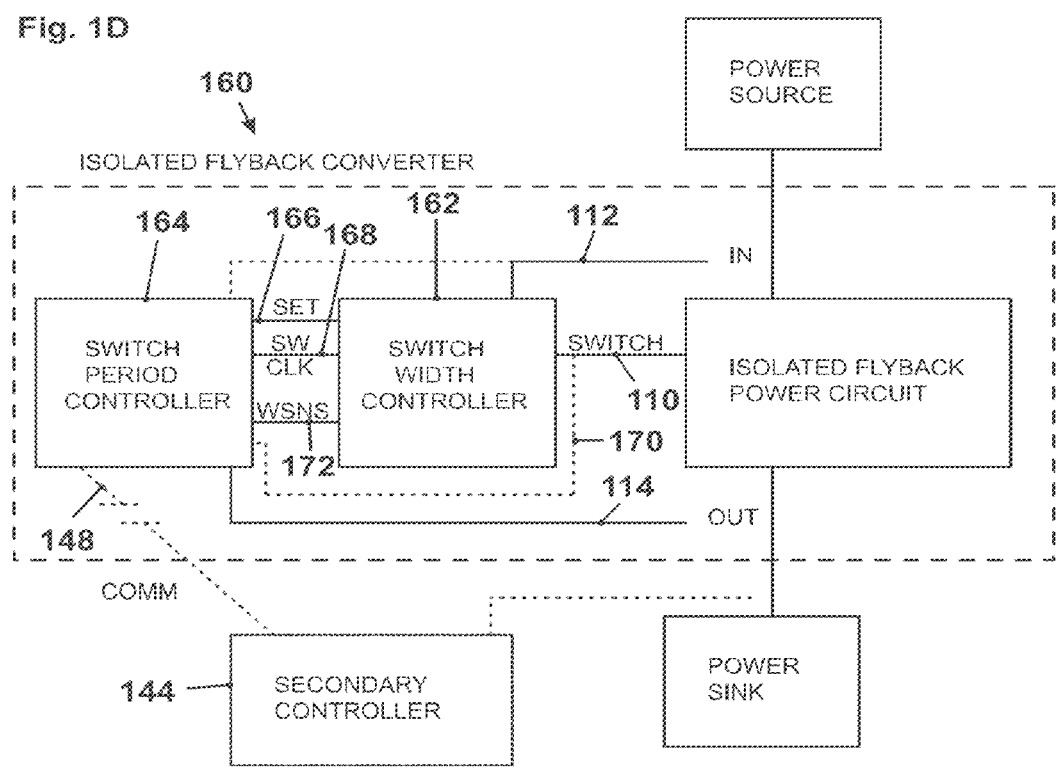
FIG. 1D is a block diagram of a flyback converter according to an embodiment of the present invention.

FIG. 1D shows a block diagram of a flyback controller 160 according an embodiment of the present invention. In converter 160, the control of the switching is functionally split between a switch-width controller 162 and switch-period controller 164. Fine dashed lines in FIG. 1D depict alternative arrangements. Such a functional decomposition may be desirable to provide a rapid response to load, supply, or power variations, e.g., via a high-speed digital, analog, or hybrid closed-loop controller (e.g., switch-width controller 162), while higher-level control logic employed to set the switch period to optimize efficiency may be performed by switch-period controller 164 operating at a different, possibly lower, control-system bandwidth. In some embodiments, switch-period controller 164 may provide an analog, digital, PWMed, or otherwise communicated set point 166 to switch-width controller 162 to control a switch width. A set point as described herein is defined as a parameter from which an error signal is derived, the minimization of which is a function of a control loop. For example, a set point may be a target input or output voltage, current, or power, that is communicated to switch-width controller 162 via an analog signal that is related, e.g., proportionally, logarithmically, exponentially, etc., to that target. Switch-width controller 162 may comprise a circuit that produces an error signal from the sum or difference between this analog signal and a measured analog signal derived from the corresponding instantaneous input or output parameter. In some embodiments, this error signal and its time integrals and derivatives may be combined to produce a feedback signal that changes an output parameter, such as the switch width. In some embodiments, set point 166 may be encoded via one or more discrete passive or active components, such as resistors, voltage references, operations amplifiers, or circuit connections as known in the art. In some embodiments, switch-period controller 164 may produce a clocking signal 168 that is used by switch-width controller 162 to coordinate the switch period. In some embodiments, clocking signal 168 may include a pulse train at substantially a desired frequency or multiple or sub-harmonic thereof. Switch-width controller 162 produces a switching signal 110. The resulting switch width may be measured by switch-period controller 164 via a connection 170 or an analogous or communication signal 172 in a control-loop feedback. Control loop initiation and operation of controllers 162 and 164 may require information about input parameter 112 and output parameter 114. In some embodiments, some information used in switch-period controller 164 may be supplied via a communication channel 148 from a secondary controller 144.

FIG. 1E shows a block diagram of a flyback converter 180 according to another embodiment of the present invention. In this embodiment, flyback converter 180 includes a switch microcontroller 182. Switch microcontroller may be implemented as a single integrated circuit having a single or multiple processors. In some embodiments, each of the processor may be a single-core or multiple-core processor. Switch microcontroller 182 may have internal memory 185 that stores instructions for operation of switch microcontroller 182. In other embodiments, the memory may be external to switch microcontroller 182 but included in flyback converter 180.

Core and arithmetic and logic unit 184 of switch microcontroller 184 may execute an algorithm that results in settings of a hardware pulse-width-modulation peripheral 186 that produce a switch signal 110. Alternatively, switch microcontroller 184 may synthesize switch signal 110 using judiciously timed firmware, e.g., via the use of high-speed interrupts, especially in concert with a hardware timer, or via carefully timed execution loops. Switch microcontroller 182 may include an analog-to-digital (A/D) converter 190 to digitize measurements for use in a control algorithm. In some embodiments, switch microcontroller 182 may also include an analog multiplexor 192 that may provide time-sharing a single-channel A/D between a plurality of signals. The plurality of signals may include input parameters 112, output parameters 114, and proximate ambient condition information 194, such as temperature. Core and arithmetic and logic unit 184 may further receive information via a communications peripheral 196 connected to a communication channel 148. In some embodiments, communications peripheral 196 may be connected to a secondary controller 144 via communication channel 148. In some embodiments, secondary controller 144 may measure and communicate proximate or averaged ambient conditions 198 of importance in a control loop, e.g., temperature, heat flux, temperature gradients in space and time, atmospheric pressure, humidity, wind speed, insolation, and the like. In some embodiments, core and arithmetic and logic unit 184 may receive commands via communications peripheral 196. In some embodiments, such commands may include instructions for setting control-system target parameters, setting calibration parameters, setting new firmware, setting control system algorithms, setting raw switch parameters, setting derating conditions and limits, and/or setting control-system parameters, etc.

In some embodiments, the core and arithmetic and logic unit 184 may transmit information including internal settings, registers, error counters, versions, operating history, data logs, real-time data, operating time, cumulative data, raw measurements, calibrated measurements, control-system activity, control-system state, control-system error state to a secondary controller (e.g., controller 144), an external control device, or an external monitoring device directly or through at least one intermediary controller. As used herein, an external control is a device that issues at least one command across a communication channel (e.g., communication channel 148) that changes an internal state of a controller (e.g., switch microcontroller 182). An external monitor is a device that receives at least one datum from a controller across a communication channel. As used herein, an intermediary controller passes data from one communication channel to another. Examples of external control and monitor devices include but are not limited to computers, browsers, application software, drivers, smart phones, cell phones, remote displays, remote controls, external controls, external displays, television sets, telephones, radios, and the like. Intermediate controllers may use a combination of wired, optical, or wireless communications including, but not limited to, blue-tooth, WiFi, Zigbee, IEEE 802-compliant protocols, CDMA, 3G, 4G, RS485, RS232, USB, SATA, PCI, PCI express, POTs, Ethernet, and other communication schemes well-known in the art.

Measurement data may include internal bandgap data, input current, input voltage, output voltage, temperature, logic-voltage, switch period, switch width, finite-difference derivatives, covariances, noise levels, rms variations, and the like. In some embodiments, switch microcontroller 184 may log or report information such as detected errors, changes in detected parameters, increases in noise levels and variations that may be symptomatic of hardware problems. In other embodiments, switch microcontroller 184 may execute one or more specialty algorithms on command, occasionally, periodically, or continuously. Examples of these algorithms include but are not limited to state-of-hardware and firmware health checks, auto-calibration procedures, firmware updates, automated testing support routines, power optimization routines, maximum power-point tracking, solar-panel power balancing routines, battery-charge balancing routines, battery discharge balancing routines, and the like.

Figure 2A:
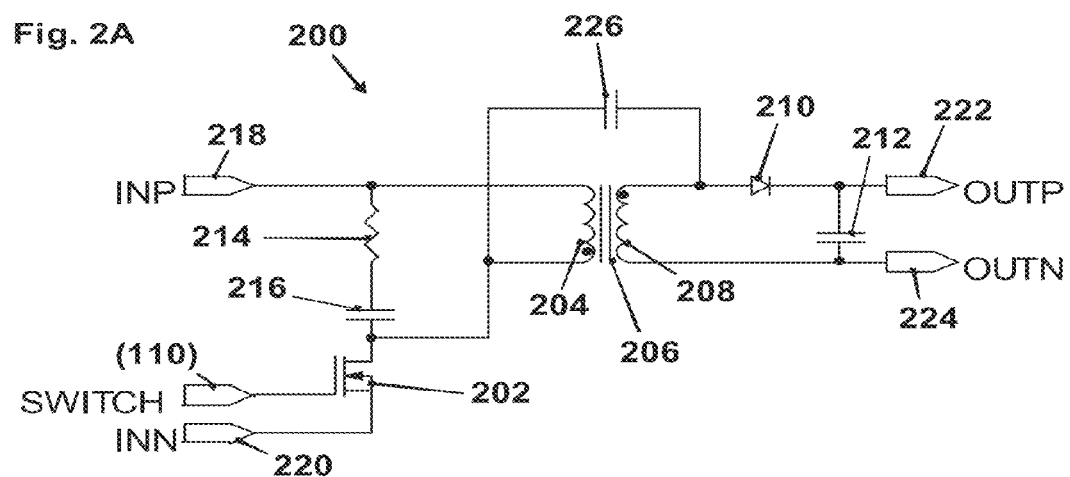
FIG. 2A shows a schematic diagram of an isolated flyback converter power circuit having a novel trans-winding capacitor according to an embodiment of the present invention.

FIG. 2A shows a schematic diagram 200 of an isolated flyback controller power circuit, e.g., power circuit 106 of FIG. 1A, according to an embodiment of the present invention. A switch 202, e.g., a semiconductor switch such as a transistor, MOSFET, IGBT, and the like, may periodically supply electrical energy via an "input voltage" and "input current" to one side 204 of a transformer 206, herein called the "primary" or "input" side, which stores a significant part of this energy magnetically. When switch 202 is opened, a significant part of this stored magnetic energy transfers to one or more isolated or coupled windings 208, herein called a "secondary" or "output" side, typically providing current through a rectifier 210, e.g., diode or synchronous rectifier, to a filter circuit 212 to smooth the resulting voltage, herein called the "output voltage." One of the advantages of the isolated flyback converter is that the output can be electrically isolated from the input; however, some applications may not need this isolation and may couple one or more of the outputs to the inputs either directly or via intermediary active or passive circuitry. As used herein, the term "isolated flyback" comprises these non-isolated or incompletely isolated circuits where the method of operation of the converter circuit is substantially similar to that of an isolated flyback converter.

During the dynamics of this power transfer, energy stored in the leakage inductance of the transformer is also released and may typically appear as a spiking voltage across switch 202 and may be many multiples of the input voltage if there is no voltage limiting, such as avalanching within one or more semiconductors. In some instances this release of leakage inductance energy may cause increased EMI/RFI and switch stresses. It is well known in the art to employ a "snubber" circuit of various arrangements (e.g., 214 and 216) to dissipate or recapture a part of this energy. The switch signal 110 is driven via an amplifier or gate driver or directly by a controller as described above in connection with FIG. 1A. The input voltage across terminals 218 and 220 may be positive or negative, although the circuit in FIG. 2A is operable for the potential at terminal 218 to be higher than the potential at terminal 220. The output voltage across terminals 222 and 224 may be positive or negative. In the specific embodiment illustrated in FIG. 2A the potential at terminal 222 is higher than potential at terminal 224. The relationship between potentials at terminals 218, 220, 222, and 224 may be arbitrary in embodiments of the flyback circuits described herein, but the type of switch, orientation of transformer poles and rectifier, connectivity of capacitor 226 etc., must be consistent with that arrangement. For best efficiency, the turns ratio of transformer 206 may be tailored to the range of input vs. output voltages.

Embodiments of the present invention may confer the advantage of reduced stress on switch 202 and rectifying diodes as well as reduced EMI/RFI. This addition comprises a capacitor 226 used to transfer energy associated with a large rate of voltage change from the secondary to primary and vice-versa. In some embodiments, capacitor 226 is connected such that it couples the primary 204 and secondary 208 winding of transformer 206. In some embodiments, capacitor 226 is in a circuit from transformer terminals having the same polarity. In some embodiments, the coupled primary terminal is on the switch side of the circuit. Capacitor 226 does not appear in conventional flyback converters and the use of other types of capacitor, e.g., a SEPIC power-transfer capacitor, is detrimental to the cost and operating envelope of an isolated flyback converter. Capacitor 226 may reduce stress, EMI/RFI, and shunting of a portion of otherwise lost power from the snubber circuit, during a relatively short span of the switching cycle associated with the release of leakage-inductance energy. For best electrical efficiency, it may be beneficial to limit this span to less than 20% and preferably less than 10% of the switch period. Furthermore, it may be beneficial to limit the average power transfer associated with this capacitor to less than 10% and in some embodiments, less than 5% of the power transfer of the converter. The use of a capacitor having an excessively large capacitance may result in reduced circuit efficiency. An excessively large capacitance moreover may increase the cost of this component and may not be economically justified compared to the benefit. In some embodiments of the present invention, the capacitance of capacitor 226 is in the pico-Farad (pF) range. In a particular embodiment, the capacitance is between 5 pF and 50 pF.

In some embodiments, capacitor 226 may be used in a flyback converter having a winding ratio from secondary to primary greater than 1 and preferably greater than 4. In some embodiments, the voltage rating of capacitor 226 is chosen to exceed or meet the expected peak voltages it experiences. In some embodiments, capacitor 226 is of ceramic or film composition. In other embodiments, capacitor 226 may feature one or more of low-cost, long life, stable capacitance, and low-loss at frequencies in the 100 kHz-100 MHz range and preferably in the range up to or beyond 1000 MHz.

The capacitor choice may be dictated by economy and intended use. In some embodiments, capacitor 226 has a ceramic C0G or NP0 or mica dielectric. In other embodiments, the capacitor dielectric may be of class-2 composition, e.g., X7R, Y5V, etc. Other embodiments may employ a "Gimmick" capacitor. A particular embodiment may employ the capacitance between planes in a printed circuit board. An advantage of this approach is that it requires no additional components and may exploit conductor planes and traces that would otherwise exist for current and heat-conduction considerations. The parallel plate size of such a capacitor for typical FR4 printed circuits is typically of the order of 500 mm$^2$ or smaller, depending on the dielectric thickness. A disadvantage of this approach may be that it requires some control over the printed-circuit dielectric, which may increase cost. In some embodiments, voltage breakdown may apply a constraint on the minimum dielectric thickness.

Figure 2B:
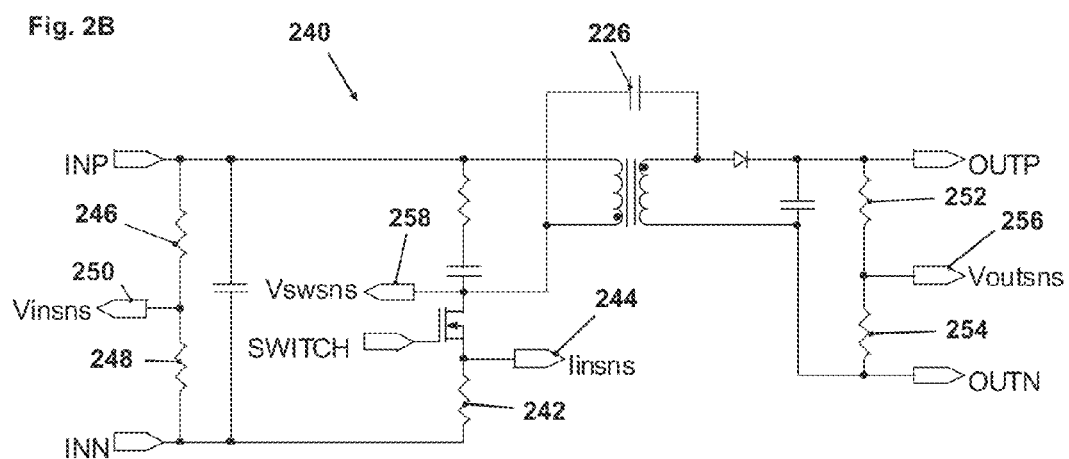
FIG. 2B shows a schematic diagram of an isolated flyback converter including input and output sensing circuitry according to an embodiment of the present invention.

FIG. 2B shows a schematic diagram of an isolated flyback power circuit 240 showing an embodiment of sensing signals that may be used in the operation of a switch controller. Element 242 is a current-sensing resistor, typically in the sub-Ohm range and in the sub-0.1 Ohm range in a particular embodiment. The current passing through resistor 242 produces a relatively low-level voltage signal 244 that can be used directly or amplified, filtered, modulated etc. to provide a suitable signal for a controller. Alternatively, a current measurement may use other techniques known in the art, including a hall-effect sensor, thermal sensor, measurement of core saturation, measurement of voltage drop across a non-ideal element such as a switch, inductor, transformer winding etc. Alternatively, the current may be inferred from a calculation. Elements 246 and 248 comprise a resistive voltage divider circuit that may comprise a part or entirety of circuit to sense input-voltage 250 for use in the operation of some embodiments of switching controllers according to the present invention. Elements 252 and 254 comprise a voltage divider that may similarly produce in part or whole an output voltage signal 256 for use in some embodiments of a controller that employ such information. Other embodiments may infer this information in other ways. Some embodiments may utilize a signal derived from a terminal 258 of a switch 260 in order to measure and infer the instantaneous or average operating state of the power circuitry. In some embodiments, filtering may be employed to prevent damage or excessive noise from affecting the controller operation or radiating EMI/RFI, since this node of the circuit may be subject to relatively high voltage, high-frequency spikes.

Switch Algorithm

Referring back to FIG. 2A, when switch 202 opens in the isolated flyback converter a substantial part of the energy stored in transformer 206 is applied to one or more secondary-side circuits. Typically, the energy flows through rectifier 210 as a current into a low-impedance, e.g., a capacitor 212, which reduces output voltage swing. At some point in the discharge, the output voltage supported by the energy being released by transformer 206 drops below the output voltage of rectifier 210 and the rectifier becomes reverse biased. At this point, the residual energy in transformer 206 has no outlet and the voltage at the transformer terminals undergoes an under-damped oscillation, reflecting the oscillation of currents internal to transformer 206. Via these oscillating currents, transformer 206 stores this residual energy, which can range up to several percent of the converted energy.

Figure 3A:
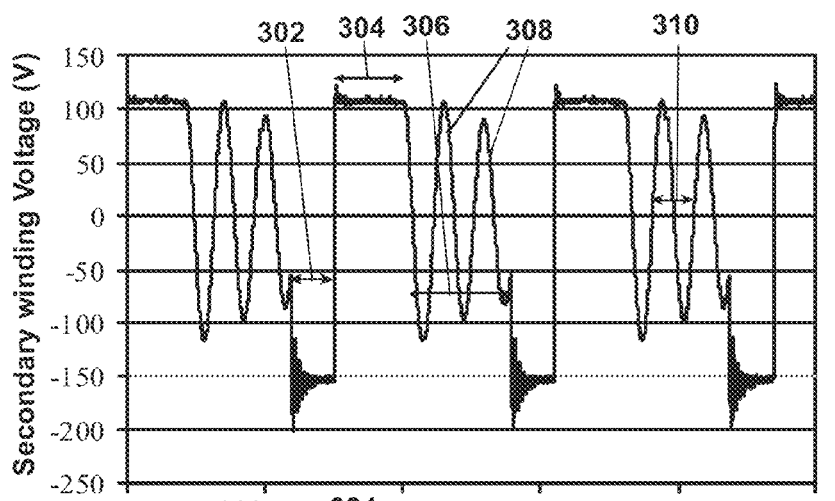
FIG. 3A illustrates voltage waveforms in a secondary winding of an isolated flyback converter at a sub-optimal switch setting according to an embodiment of the present invention.
Figure 3B:
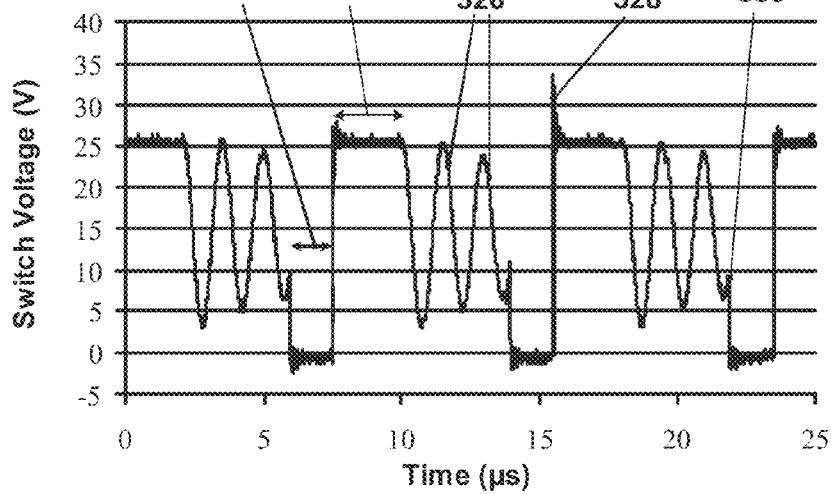
FIG. 3B illustrates voltage waveforms across the switch of an isolated flyback converter at the same sub-optimal switch setting as in FIG. 3A, according to an embodiment of the present invention.

FIG. 3A shows an oscilloscope trace 300 of the voltage across the secondary winding 208 of transformer 206 having a 1:10 turns ratio from a single primary to a single secondary winding. FIG. 3B shows a simultaneous trace of the voltage across switch 202 (taken at position 258 illustrated in FIG. 2B). The time period 302 and switch voltage 322 corresponds with the time that switch 202 is conducting and transformer 206 is storing energy magnetically. The period 304 and switch voltage 324 corresponds to the part of the switch cycle in which switch 202 is turned off (non-conducting) and stored energy is being transferred to the output side, which in this embodiment is a load at about 100 V. The time interval 306 and voltage waveform 326 is the remaining period that switch 202 is off during the switching cycle, herein called the "ring duration." The voltage swings, e.g., 308 and 326, reveal the oscillation caused by residual energy in transformer 206. The interval 310 is the natural oscillation period of this energy, herein called the "ring period," $p_{ring}$. The brief period of voltage spiking 328 is caused by the discharge of energy stored in the leakage inductance of transformer 206. In this embodiment, this energy is damped in part by resistors 214 and capacitor 216 and redistributed by capacitor 226, which may provide for increased efficiency and lower EMI/RFI. The discontinuity in the voltage at location 330 may be associated with a loss of efficiency and less than optimal transfer of power to the output.

Figure 3C:
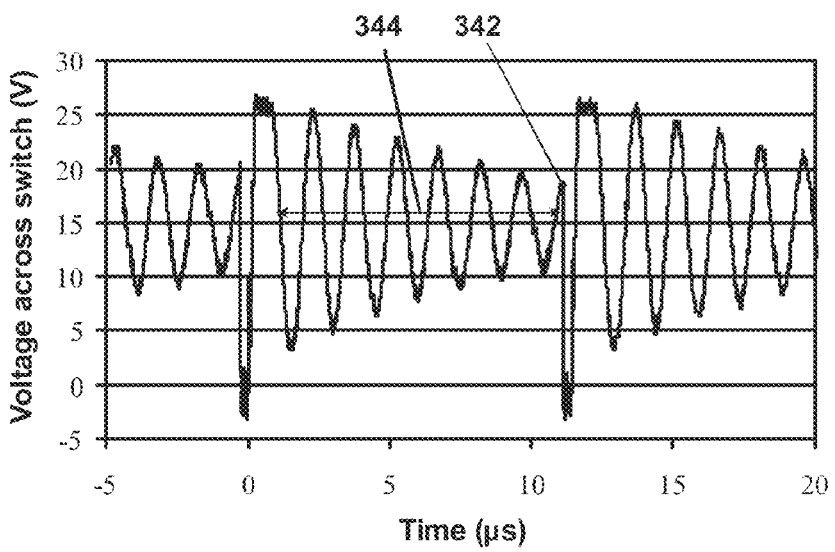
FIG. 3C shows voltage waveforms across the switch of an isolated flyback converter at a different sub-optimal switch setting according to an embodiment of the present invention.

FIG. 3C shows an oscilloscope trace 340 of the switch voltage at a lower current setting. The ring duration 344 is longer than 306 and more oscillations from the residual energy are evident. The voltage discontinuity at the start 342 of the switching cycle is more pronounced than that at 330. Embodiments of the present invention mitigate this discontinuity and set the ring duration to maximize efficiency.

Depending on the ring duration, i.e., the timing of the next switch cycle relative to the internal oscillation, this residual energy can be transferred back to the primary side, kept in transformer 206, where damping and switch losses may convert it to heat, or transferred to the secondary side. The converter power efficiency is highest when the residual energy is transferred to the secondary. Embodiments of the present invention cost-effectively coordinate switch on-time and duration (alternatively, duty-cycle and frequency) parameters to maximize the transfer of residual energy to the secondary. This condition is a form of soft switching and has the additional advantages of reducing EMI/RFI and switch and rectifier stresses, among others.

Figure 4:
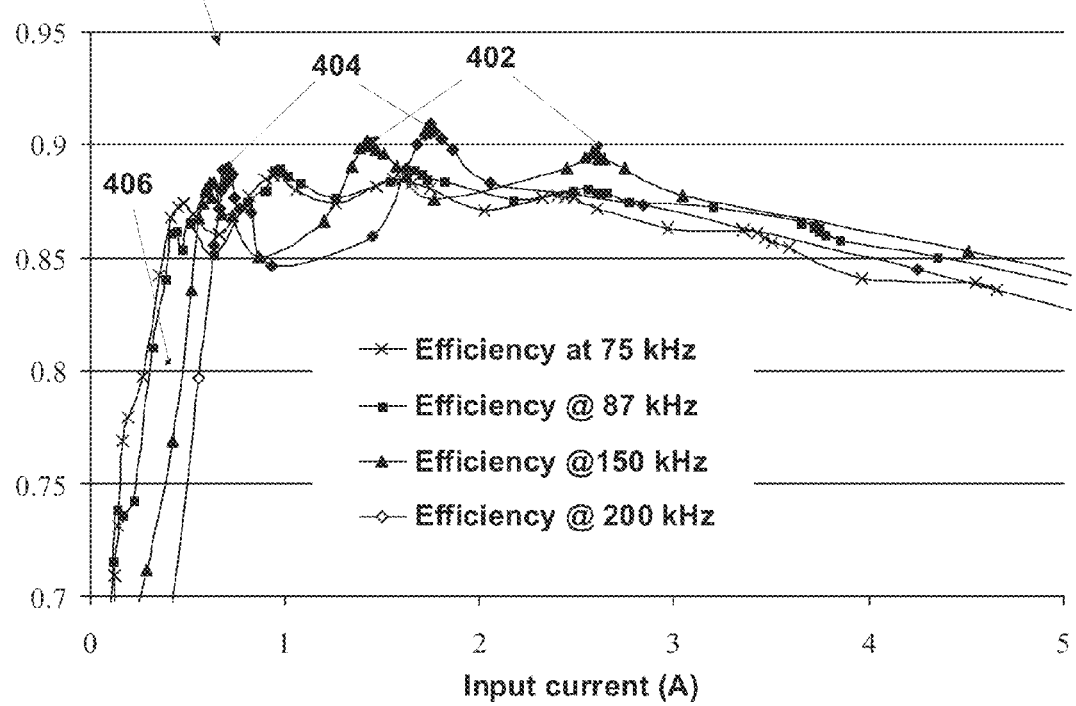
FIG. 4 illustrates modulation of converter efficiency with input current at different switch frequencies in an isolated flyback converter according to an embodiment of the present invention.

Some conventional controllers employ a fixed switch period. FIG. 4 shows a plot 400 of converter efficiency at various switch periods vs. input current at constant input and output voltage. Efficiency peaks at various input currents e.g., 402, 404 that depend on the switch frequency. The large indicated drop in efficiency at low current 406 is an artifact of non-ideal behavior of the programmable load used in to make these measurements. The present invention may vary the switch frequency to ensure operation at an efficiency peak over a wide range of input and output conditions.

Figure 5:
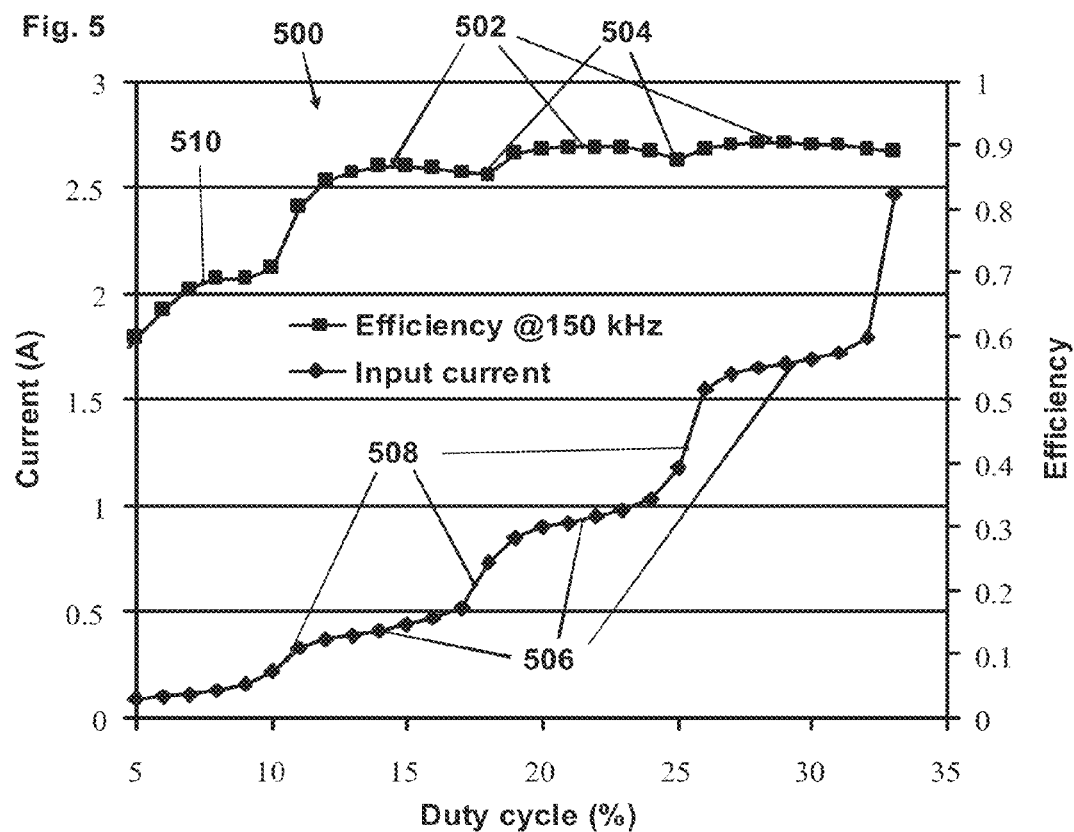
FIG. 5 illustrates modulation of converter efficiency and input current at different switch widths at constant switch period according to an embodiment of the present invention.

FIG. 5 shows a plot 500 of the input current and converter efficiency at constant input and output Voltage and switch frequency (period) vs. switch duty cycle (width). Efficiency peaks 502 and troughs 504 correspond respectively to low-slope 506 and high-slope 508 regions of the current vs. switch width curve, consequently, some embodiments in accordance with the present invention employ at least an algorithm that adjusts the switch timing to operate in a region having a minimum dependence of current on switch width, a minimum finite-difference-based derivative of the current with width (e.g., $\min(\Delta I_{in}/\Delta w)$, $\min(\Delta I_{out}/\Delta w)$), or a zero finite-difference based second derivative of the current with width (e.g., $\Delta^2 I_{in}/\Delta w^2=0$, $\Delta^2 I_{out}/\Delta w^2=0$). The low efficiency in region 510 is an artifact of a non-ideal programmable load. We observe regions of operation in which the current actually decreases with increasing switch width or duty cycle. In some embodiments, it may be important for a closed-loop controller to check for and adapt its control strategy for this regime.

Figure 6:
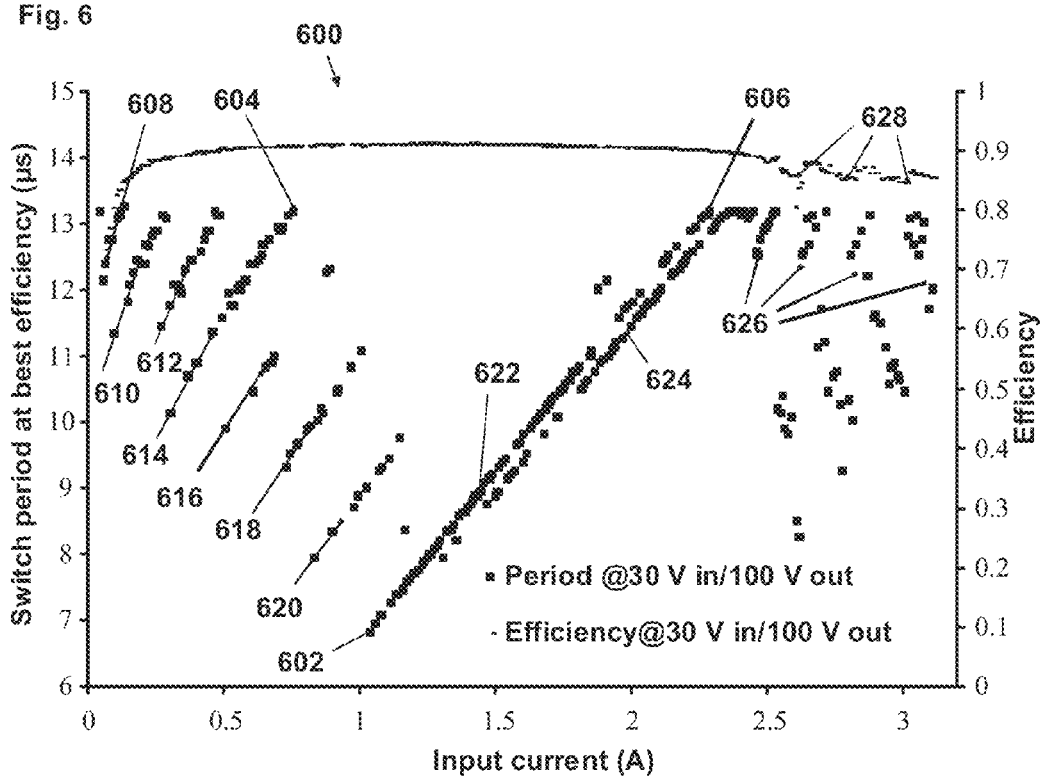
FIG. 6 shows a plot of switch periods vs. input current that produce the peak efficiency for any switch setting and a plot of the best realized efficiency according to an embodiment of the present invention.

Embodiment so the present invention relate to how many cycles of the internal ringing to allow during a switch cycle. Because of losses and non-idealities in components throughout the converter, the most efficient choice varies with the input and output voltage and current. Lower currents generally favor a greater number of rings, corresponding to a lower switching period. At a given output voltage, as input currents increase, the optimal ring duration drops in discrete intervals substantially corresponding to the ring period. FIG. 6 contains results taken from a comprehensive scan of discrete switch settings supported by hardware PWM, in accordance with an embodiment of the present invention. Plot 600 shows the peak recorded efficiencies and the corresponding switch period vs. input current at a fixed input and output voltage, but a variable switch width and period. The maximum switch period was limited arbitrarily in this scan to approx. 13.3 µs (75 kHz). The minimum switch period was limited to about 5 µs (200 kHz). As evidenced in the plot, truncation of the minimum switch period scan range may not have affected the results, since the minimum period that produced a peak efficiency result 602 was approximately 6.6 µs. Truncation of the maximum period affects the performance at low current 604 and high current 606. Such truncation may be needed because of hardware limitations, ripple requirements, etc. Some preferred embodiments of such scans do not truncate the scan range. Some embodiments scan adaptively to provide coverage of regions of particular interest (e.g., peak efficiency) while avoiding excessive scan time on unfavorable states.

Figure 7:
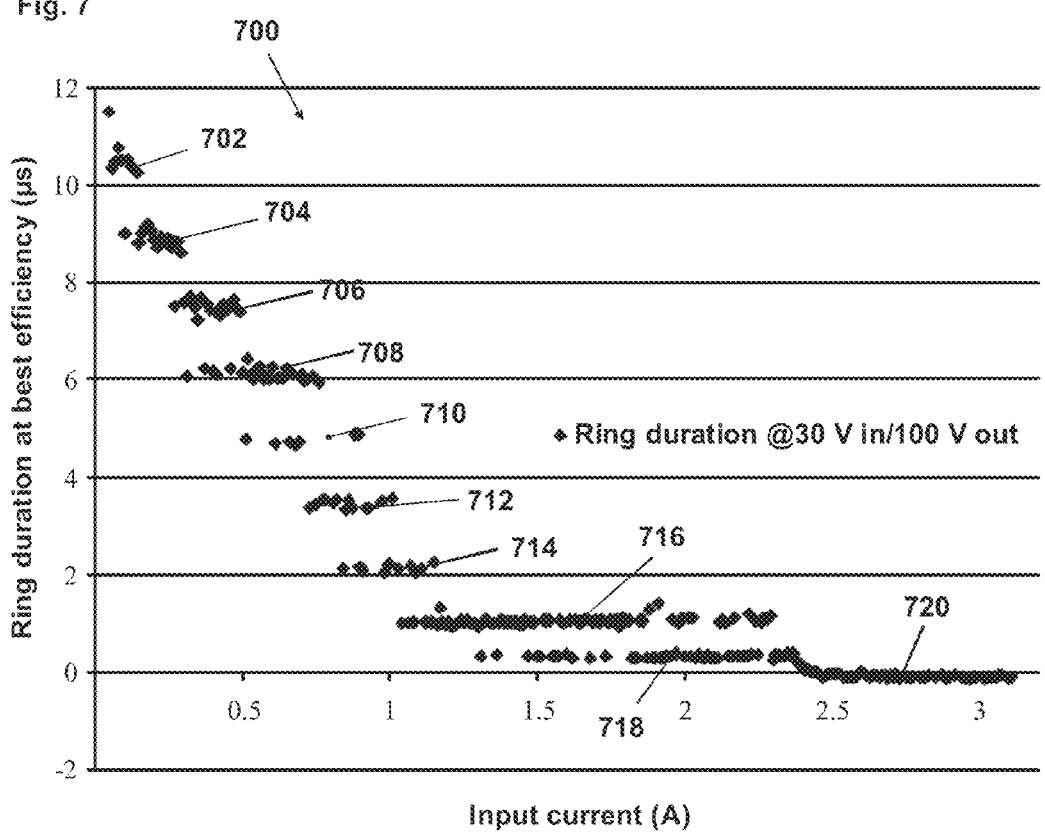
FIG. 7 shows a plot of the ring duration calculated from the switch periods in FIG. 6, according to an embodiment of the present invention.

FIG. 7 shows a plot 700 of the calculated ring duration corresponding to the peak-efficiency states shown in FIG. 6. The ring duration is calculated using a simple expression:

$$t_{ring}=p-(w+\delta w)[1+\eta^{1/2}\rho V_{in}/(V_{out}+\delta V)], \quad (1)$$

where δw is a parameter that accounts for rise and fall times and other reasons that the effective switch width may differ from the width applied to a PWM circuit, η is measured converter efficiency, ρ is the secondary-to-primary windings ratio, and δV accounts for any forward voltage drop in an output rectifier (e.g., 210).

As evidenced by patterns in plot 600 above, peak operating conditions fall into substantially contiguous groups herein called "bands," including 608/702, 610/704, 612/706, 614/708, 616/710, 618/712, 620/714, and 622/716. These bands respectively contain 7, 6, 5, 4, 3, 2, 1, and 0 complete ring periods. In scans in which the maximum period is not truncated as severely, we observe similar groupings having more than twelve complete ring periods at low currents. Because of measurement noise, PWM quantization, and physical phenomena within the converter, the minimum and maximum currents spanned by elements of the bands may overlap. In such cases, the efficiency differences between the bands may be negligible.

Above a threshold current (e.g., near 602), a controller according to the present invention may transition to a scheme in which the switching is synchronized such that the ring duration is a fraction of the ring period 716 and the period increases approximately linearly with input current. Above a higher threshold current (e.g., near 624), the converter may transition to switch timing having approximately the same slope and intercept in the period/input-current curve, but a discretely longer switch width, resulting in a shorter ring duration by a fraction of the ring period 718. This mode may continue until a maximum period is reached, e.g., near 606, defined by hardware limitations or ripple requirements, etc., or a maximum switch width is reached, e.g., defined by peak-current limitations, etc.

At higher load currents still, there may be a transition to an alternate operating mode, having an approximately zero or slightly negative ring period 720, according to transformer charging and discharging times. The curves of most efficient switch period and width vs. input current in this regime 626 break dramatically from the near-linear, positive-slope ramps associated with the lower-current regimes, but are similarly amenable to simplification and incorporation into open and closed loop switch-control systems. Operation in this regime allows a substantial increase in transferred power for given hardware at the expense of some loss of efficiency 628 and greater stresses, particularly in the rectifier. Some preferred embodiments of the present invention constrain the operation to avoid this alternative mode. Some embodiments of the present invention avoid this alternative mode when it may cause damage to the unit, e.g., because of ambient temperature, input and output voltage and current, etc.

FIG. 8 contains a plot 800 that is similar to plot 600 described above, but showing an overlay of operation at different input and output voltages. These plots reveal similar features, such as discrete bands, e.g., 802, but different band slopes and intercepts and different band termini (e.g., 804). From an analysis of data over a wide range of input and output conditions, it can be seen that the optimum transitions between bands are substantially dictated by an input current parameter" $I^*=I_{in}/V_{out}$. At input-to-output voltage ratios near the winding ratio of the transformer, the slopes and intercepts of the bands are also substantially dictated by $I^*$, that is, the bands in a plot like 800 with the current axis of each data set scaled by the inverse of the respective output Voltage lie substantially atop each other in clear and discrete groups. However, for ratios of input to output voltage that depart from the winding ratio significantly, the band slopes and intercepts vary in a manner that may resemble, but depart from a simple-theoretical analysis of switch solution loci having a prescribed number of ring periods (integral and fractional) in the ring duration. A part-empirical, part-theoretical approach to producing an effective model of this variation can be of use for control purposes. This approach revealed that, at a given voltage ratio, a common correction factor applied to the slopes of each band and another common correction factor applied to the intercepts of each band could reproduce experimental results with reasonable fidelity.

Thus for fixed hardware at a prescribed input current, the combined theoretical and empirical analysis of best-period function $P(I_{in}, V_{in}, V_{out})$ and best-width function $W(I_{in}, V_{in}, V_{out})$ revealed that the functions approximately depend upon two parameters, an "input current parameter" $I^*=I_{in}/V_{out}$ and a voltage ratio parameter $V^*=\rho V_{in}/V_{out}$. These solutions could be approximated by a succession of substantially linear discrete curves. These discrete parts of the solutions are enumerated as "bands." Band '0' (b=0) corresponds to the shortest ring duration comprising solutions whose optimal period scales positive linearly with input current. Band '1' (b=1) corresponds to the next shortest ring-duration, whose best-period solutions lie substantially along the same curve as Band 0. Bands 2, 3, 4, etc. (b=2, 3, 4, . . . ) correspond to progressively longer ring durations with approximately one ring-period jump between bands.

The choice of optimal band was found to depend most significantly on the parameter $I^*$. The slope and intercept of each linear segment of the p vs. $I_{in}$ curve depend on the band, b, and $V^*$. In one embodiment, for a given target input current, the (open-loop) switch period could be estimated using a procedure as illustrated in a flow diagram 806 of FIG. 8A.

Figure 8A:
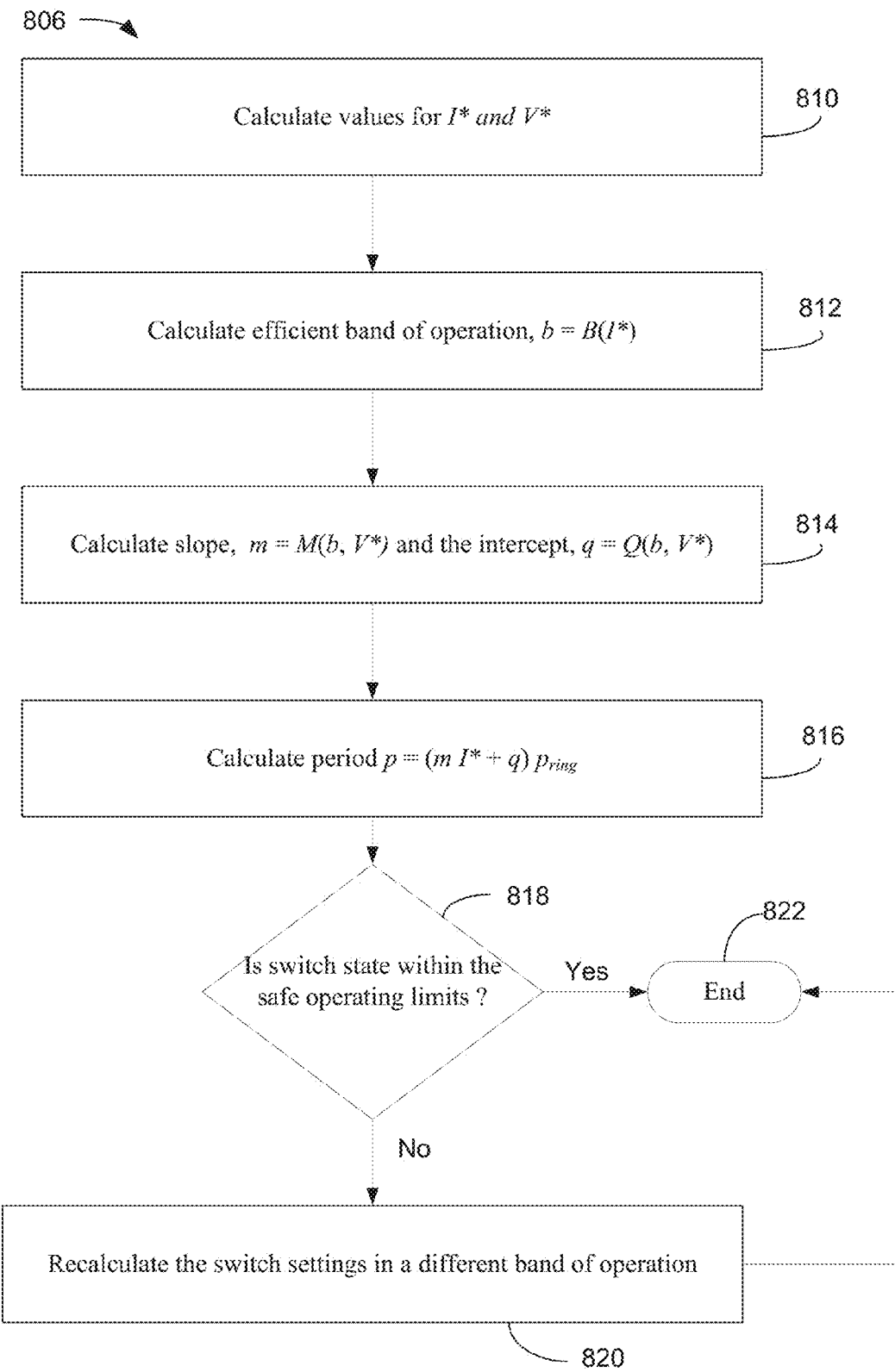
FIG. 8A is a flow diagram illustrating a method for calculating switch setting according to an embodiment of the present invention.

As illustrated in FIG. 8A, initially the values for $I^*$ and $V^*$; are calculated (810). Thereafter, a most efficient band of operation, $b=B(I^*)$ is calculated (812). Next, the slope, $m=M(b, V^*)$ and the intercept, $q=Q(b, V^*)$ can be calculated (814). Thereafter the period $p=(m\ I^*+q)P_{ring}$ can be calculated, where $p_{ring}$ is the natural ring period (816). The resulting switch state can be check to see if it is within the safe operating limits (818) and if it is not within the safe limits, recalculate the switch settings in a different band of operation (820). The process can end at step 822.

We found that the width may be efficiently calculated from the knowledge of the period according approximately to the formula:

$$w=(2.3I_{in}p\alpha L_{in}/V_{in})^{\wedge}\tfrac{1}{2}+\beta, \text{ if } b=0, \quad (2)$$

and $$w=(2I_{in}p\alpha L_{in}/V_{in})^{\wedge}\tfrac{1}{2}+\beta, \text{ otherwise}, \quad (3)$$

where $L_{in}$ is the inductance of the primary side of the transformer, coefficient α may be approximately unity and the offset β may be small. The coefficient α may depart from unity as a result of saturation and other non-ideal effects, converter losses, etc. A non-zero β may reflect the effect of turn-on times, turn-off times, slew rates, and the like as well as the effects of core saturation or other non-idealities. Because the inductance may vary from circuit to circuit, it may be useful to include in the calculation a calibration factor, e.g., γ such that $L_{in}=\gamma L_0$, where $L_0$ is a nominal primary inductance. The slope and intercepts were found to be decomposable into the product of a coefficient that depends only on b, and curves that depend only on V.

Figure 9A:
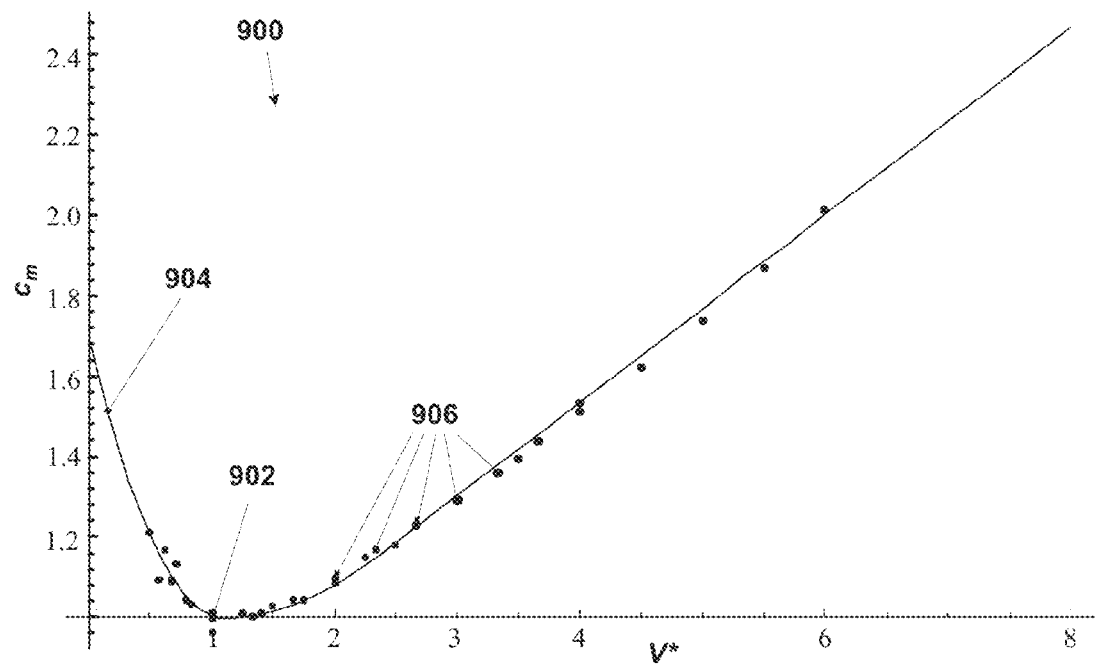
FIG. 9A shows an overlaid plot of a band-slope coefficient vs. voltage ratio parameter and a best fit to a theoretical function according to an embodiment of the present invention.
Figure 9B:
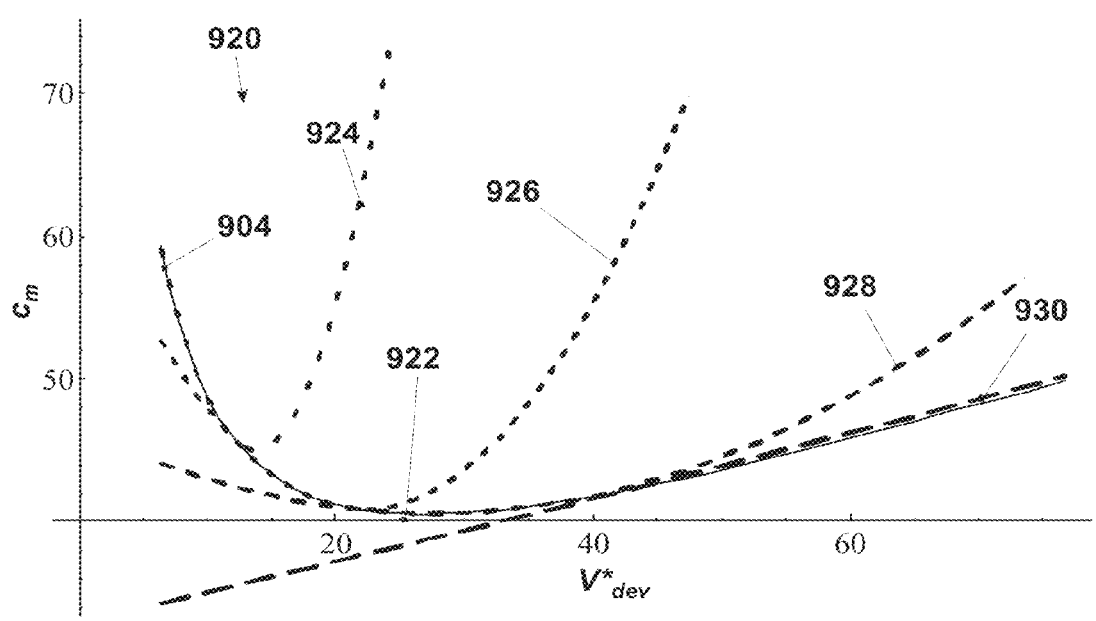
FIG. 9B shows an approximate decomposition of the theoretical function in FIG. 9A into piece-wise quadratic and linear segments.
Figure 10A:
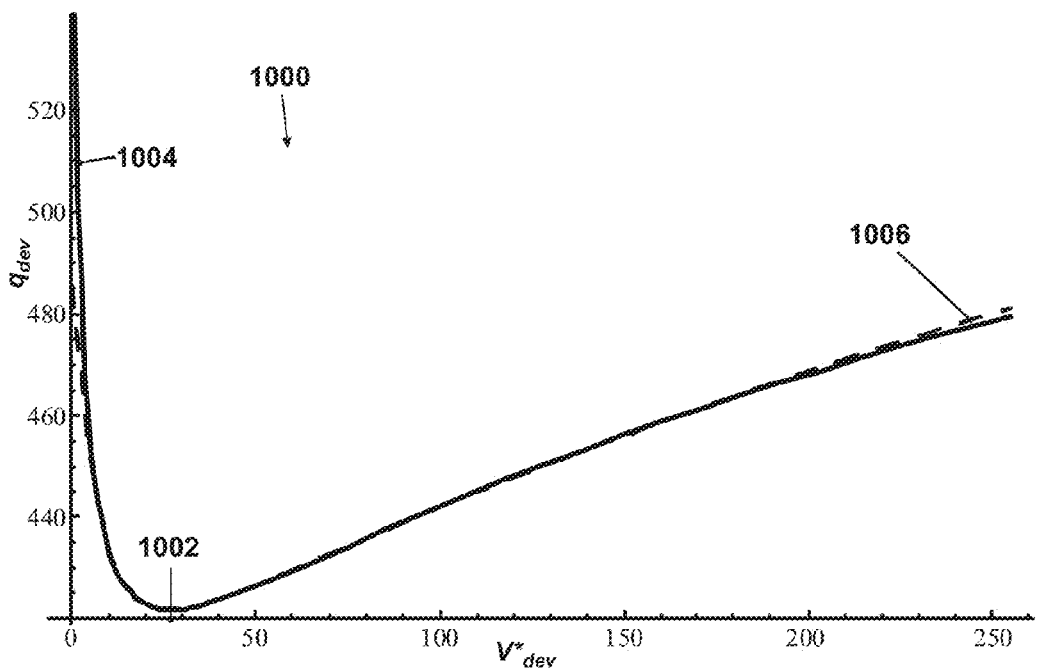
FIG. 10A shows an overlaid plot of a band-intercept coefficient vs. voltage ratio parameter and an approximation based on piece-wise quadratic and linear segments, according to an embodiment of the present invention.
Figure 10B:
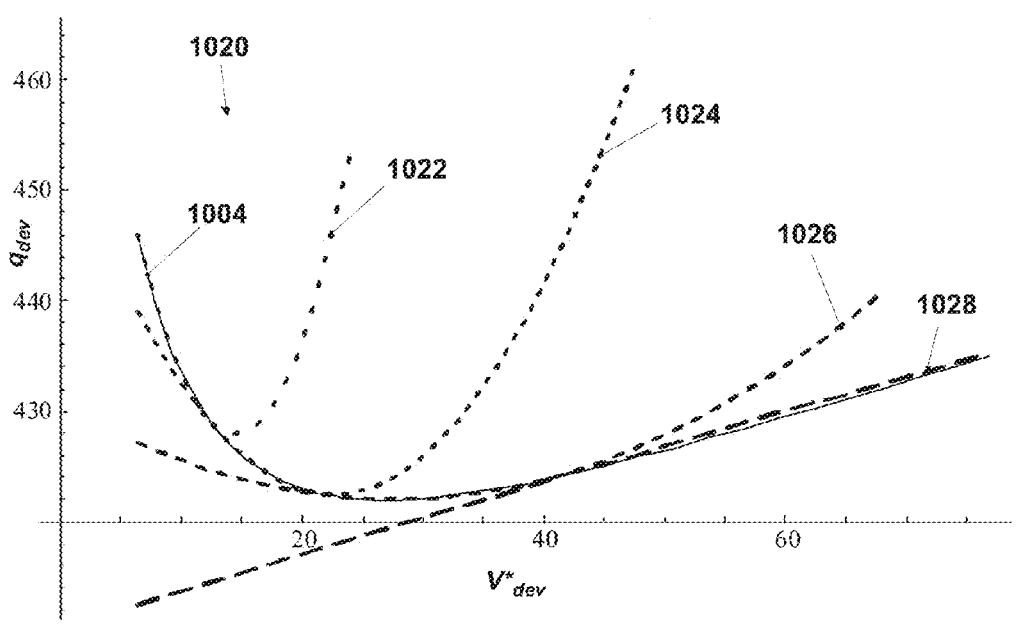
FIG. 10B shows details of the quadratic and linear segments comprising the approximation in FIG. 10A, according to an embodiment of the present invention.
Figure 14A:
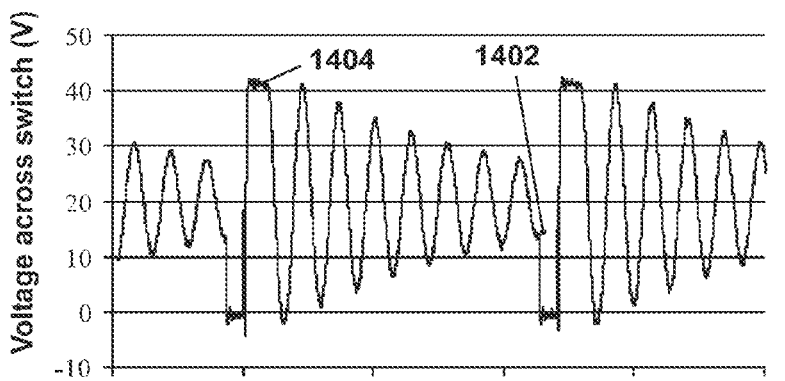
FIG. 14A shows a switch voltage waveform after convergence of a closed loop controller at an input current of 0.1 A according to an embodiment of the present invention.
Figure 14B:
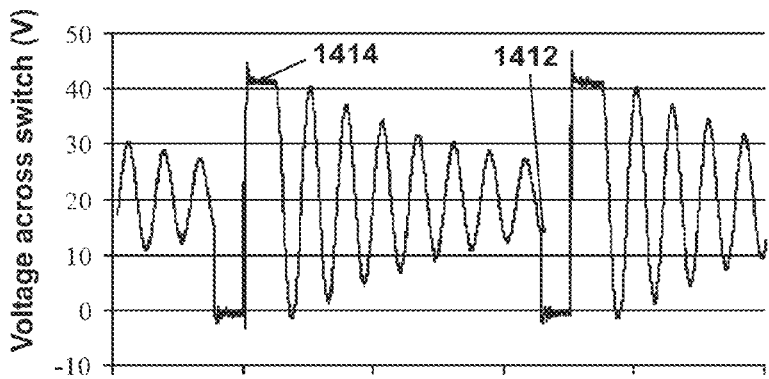
FIG. 14B shows a switch voltage waveform as in FIG. 14A, at an input current of 0.2 A according to another embodiment of the present invention.
Figure 14C:
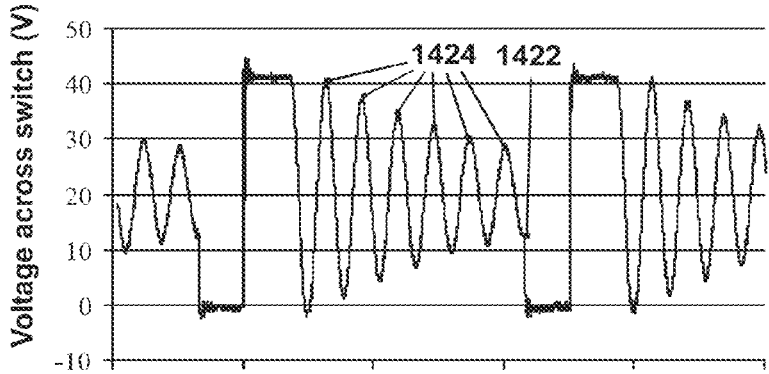
FIG. 14C shows a switch voltage waveform as in FIG. 14A, at an input current of 0.5 A according to yet another embodiment of the present invention.
Figure 14D:
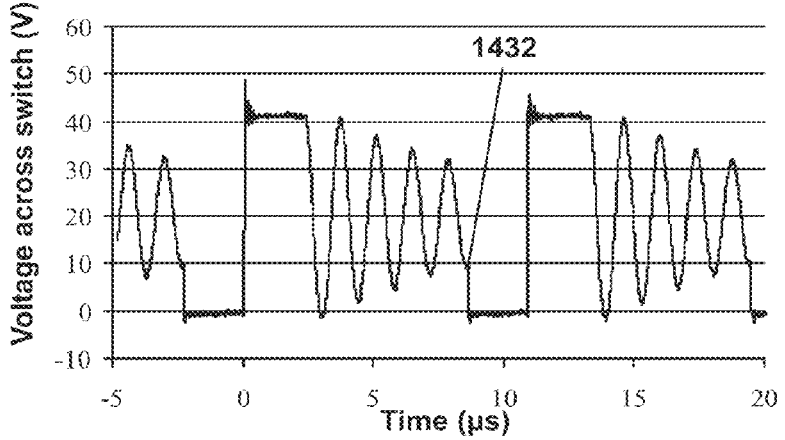
FIG. 14D shows a switch voltage waveform as in FIG. 14A, at an input current of 1.0 A according to still another embodiment of the present invention.
Figure 14E:
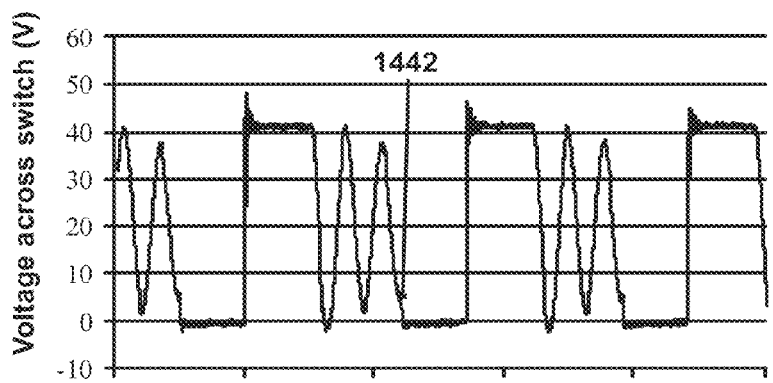
FIG. 14E shows a switch voltage waveform as in FIG. 14A, at an input current of 1.5 A according to an embodiment of the present invention.
Figure 14F:
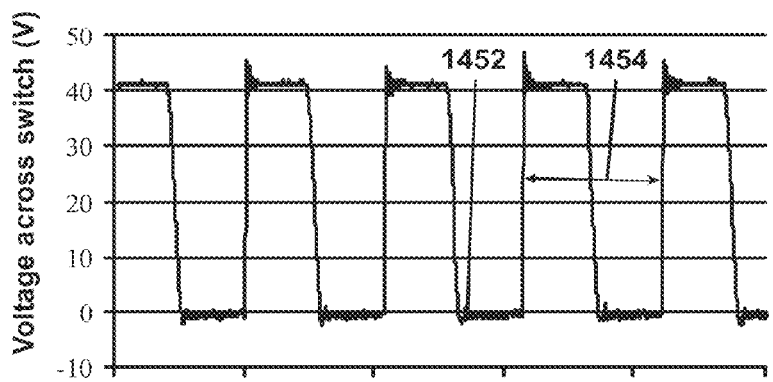
FIG. 14F shows a switch voltage waveform as in FIG. 14A, at an input current of 2.0 A according to an embodiment of the present invention.
Figure 14G:
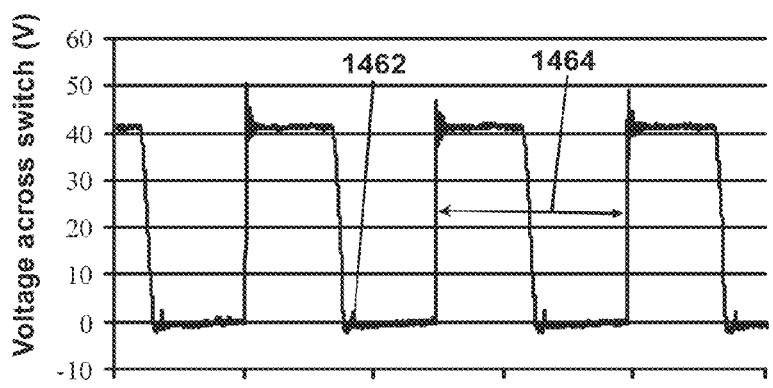
FIG. 14G shows a switch voltage waveform as in FIG. 14A, at an input current of 3.0 A according to an embodiment of the present invention.
Figure 14H:
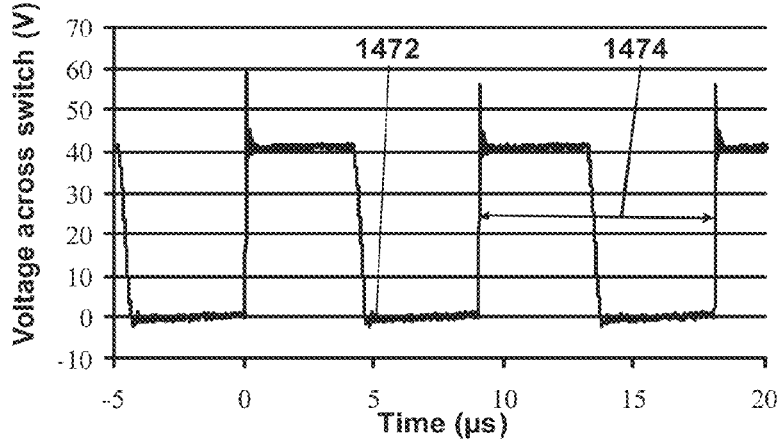
FIG. 14H shows a switch voltage waveform as in FIG. 14A, at an input current of 3.9 A, according to an embodiment of the present invention.

FIG. 9A shows a plot 900 of a correction factor, $c_m$, to be applied to the band slopes vs. $V^*$. For operation near unity $V^*$, 902, the correction factor varies relatively little. Curve 904 is a best fit to experimental data (e.g., 906) of a theoretically derived curve 904 having some adjustable parameters. FIG. 9B shows a plot (920) of curve 904 with axes scaled for calculation in a microcontroller, with point 922 corresponding to point 902 of FIG. 9A. To facilitate quick calculations in a low-cost microcontroller, the curves can be decomposed into a series of piece-wise quadratic and linear curves (924, 926, 928, and 930). Alternatively, the curves could be decomposed into a series of piece-wise linear segments or a series of higher- or lower order curves. FIG. 10A shows a plot (1000) of the correction factor for the band intercepts in device units. Point 1002 corresponds to $V^*=1$. Curve 1004 is a theoretically derived curve that is constrained to be consistent with 904. Curve 1006 is an approximation of curve 1004 comprising piece-wise quadratic and linear curves. FIG. 10B illustrates a plot 1020 that details the decomposition of the curve into segments of curves 1022, 1024, 1026, and 1028. Other approximation methods suitable for efficient calculation are known by ones skilled in the art.

FIG. 11 shows a plot 1100 comparing the results of the model of best period with experimental data. Band transitions 1102 are appropriately within the extents of the best-efficiency bands. In this plot, the model was adjusted to over-predict the best period by a small amount, e.g. 1104, so that a subsequent closed control loop can be based on assumptions of the sign of the initial period error. Alternatively, the model can be adjusted to under-predict or closely predict the best period.

These calculations may be completed within 30-100 is on a low-cost, 8-bit microcontroller having an 8 bit-by-8 bit multiplication peripheral. This calculation time compares favorably to the settling time of a closed-loop control scheme. The "band" is an important parameter in this control scheme because a closed-loop control scheme can find a local optimum in the efficiency curve according to another scheme we have developed as part of the present invention, but cannot independently choose the global optimum band without additional information. An alternate control scheme may be devised in which only the optimum band is calculated, and the closed-loop control system servos to this band, e.g., by counting passages through an effect of the ringing on derivatives of the input current with switch timing. Alternatively, the control system may measure or learn output current or output power via communication and adjust its band of operation to maximize its efficiency via direct measurements.

A closed loop control system may be used to improve upon the accuracy of open-loop calculations, to correct for load and input variations, to perform the entirety of the switch control, etc. In either case, a closed control-loop requires a sensed input. In some embodiments of the present invention an input is derived from the input current. In some such embodiments, a control signal is derived from finite-difference derivatives of a current with at least one switch parameter. A control signal may be derived by perturbing at least one switch parameter and measuring the resulting change of at least one input or output parameter or calculating a change in a parameter by subtracting it from another measurement made in a nominal or alternatively perturbed state. In some preferred embodiments the parameter may be the input current. In some preferred embodiments, a perturbation may be the switch width, the switch period, or a combination of switch width and switch period. In some embodiments, the control signal is derived from higher-order finite derivatives of an input or output parameter with respect to switch parameters, in some embodiments the control signal is derived from mixed derivatives of input or output parameter with respect to switch parameter.

The local best efficiency may correspond to minima of the derivatives or finite difference of input current with width and input current with period. Further, at constant input current, a control signal comprising the sum of the derivative of input current with width and twice the derivative of the input current with period may provide a control signal having a substantially sharp minimum at the local efficiency peak. FIG. 12 shows a plot 1200 of this control signal and the converter efficiency at constant input and output voltages and constant input current. Peaks in the converter efficiency 1202 correspond closely to sharp minima, having a value near zero, in this control signal. In some embodiments this signal can be measured by performing sequential width and period perturbations. In some embodiments, this signal can be measured by performing a combined width and period perturbation. In some embodiments, perturbation may be performed by adjusting PWM parameters in microcontroller or logic firmware or digital hardware and in others, perturbations may be imposed via an analog perturbation that affects switch timing. In some embodiments, the resulting current deviations may be measured by analog to digital conversion, in others, the analog deviations are processed by circuitry, such as linear and non-linear amplifiers, envelope detection, rectification, mixing, high-pass, low-pass, and band-pass filters, AC-coupling, integrators, including gated integrators, differentiators, and the like, to indicate or effect a control-system correction. In some embodiments, the imposed switch perturbations are applied at a relatively high-frequency compared to the control-system bandwidth. In some embodiments, the perturbations are applied and removed for a single or multiple switch cycles. In some embodiments, the perturbations are applied and removed for a single or multiple analog-to-digital conversion cycles.

FIG. 13 shows a plot 1300 of efficiency and switch width vs. switch period at constant input and output voltage and constant input current. Peaks in the efficiency curve correspond to regions of steep negative slope in $\partial w/\partial p$ at constant $I_{in}$. Consequently, optimal points of operation may correspond to points where ($\partial w/\partial p$ at constant $I_{in}$) is negative or minimum. Alternatively, $\partial p/\partial w$ at constant $I_{in}$ could also be used a control signal. At best efficiency, the sensitivity to switch width is comparatively low.

Some control algorithms employ a scheme to establish the correct band of operation for best efficiency. Some embodiments establish this correct band by a calculation of b. Some embodiments may perform a calculation to determine initial switch settings that lie in a region near the optimal switch settings, e.g., within a closed-loop control system "lock in" range of the optimal switch settings. Some control-system embodiments may slew across a range of switch settings to find a region near the optimal switch settings. Some such embodiments count transits of control-signal features to reach a region of optimal switch settings.

Having established switch settings that are approximately correct, a control system may:
(1) Adjust the switch width to reach a target input or output parameter (e.g., input current, voltage, power, output voltage, output current, etc.) herein called a "target."
(2) Adjust the switch period to reach a target,
(3) Adjust the switch width to cross a target,
(4) Adjust the switch period to cross a target,
(5) Wait for a settling time interval,
(6) Record a measurement,
(7) Perturb the switch width and measure an effect of the perturbation, (8) Perturb the switch period and measure an effect of the perturbation,
(9) Perturb a combination of switch width and period and measure an effect of the perturbation,
(10) Derive a control signal from at least one measurement,
(11) Derive a control signal from at least one communicated datum,
(12) Select a new switch width as a result of a control signal,
(13) Select a new switch period as a result of a control signal,
(14) Select a new switch width and period as a result of a control signal,
(15) Test for a best control-signal condition and save the corresponding state,
(16) Test for convergence to an optimum,
(17) Test for crossing a threshold value of a poor control-signal condition,
(18) Test for crossing a threshold worsening of a control-signal condition from a best state,
(19) Test for crossing a maximum interval from the initial set point,
(20) Revert settings to a saved state corresponding to a best control-signal condition,
(21) Select a new operating mode or algorithm.

For example, a controller may establish an accurate and efficient operating condition relatively quickly by adopting a control mode having one or more of the following steps:

1. Calculate an initial set point that exceeds the optimum period by an amount that does not exceed the capture range of a control system. In some embodiments, the controller may check to see if a new target is in the same band as an old setting and near enough to it to slew settings, otherwise adopt the initial switch settings and, in some embodiments, wait an appropriate settling interval.
2. Initialize outer loop variables e.g., setting a "best control signal" parameter to a value that will ensure the control loop will not terminate prematurely.
3. Initialize inner loop variables e.g., setting a "least error" parameter to a value that will ensure the control loop will not terminate prematurely.
4. Adjust the switch width until crossing the target. In some embodiments, the control system may require crossing the target from a particular direction (e.g., increasing or increasing current width only). In some cases the error from the target is measured and the switch state saved having the least error. In some embodiments, the control system may revert to the least error state.
5. Perturb the switch width and period and measure a parameter, e.g., the input current.
6. Obtain a control signal by subtracting a parameter measured under a perturbation from a parameter measured under a different or no perturbation.
7. Test if the control signal is better than the "best control signal." If so, save it as the new best control signal and save the current switch state as the best state.
8. Test if the control signal is excessively worse than the best control signal by a fixed, calculated, relative, or absolute amount or for other reasons for the loop to terminate, e.g., excessive iterations, switch settings too far from initial settings, range errors in etc. If so, switch to the best switch settings and terminate the loop.
9. Decrement the switch period or subtract a calculated value from the switch period. Alternative embodiments maybe coded to increase the switch period, dither the switch period or otherwise vary the switch period. Some embodiments may include an appropriate change to the switch width. Some embodiments may tailor this change so that the excursion from the target is reduced.
10. Increment a loop counter.
11. Go to step 3.

In some embodiments, the order of the control loops may be reversed. In some embodiments, additional control loops, such as power optimization loops may be run in an innermost, intermediate, or outermost loop.

FIGS. 14 A-H show switch voltage waveforms 1400, 1410, 1420, 1430, 1440, 1450, 1460, and 1470 at the termination of the above set of control system steps at constant input and output voltage and currents respectively of 0.1, 0.2, 0.5, 1.0, 1.5, 2.0, 3.0, and 3.9 A. In this embodiment, self-protection code in the internal controller limits the maximum input current to less than 4.0 A. In each case the ring duration results in a minimal voltage discontinuity at the onset of switching (1402, 1412, 1422, 1432, 1442, 1452, 1462, and 1472) and the number of ring cycles, e.g., 1424, (band) is judiciously chosen to attain the maximum efficiency that the hardware can produce at that input and output state. In this embodiment, at 0.1 A and 0.2 A, the controller locks to a solution having 7 complete rings in the ring duration and an increasing width (1404 vs. 1414), thereby increasing the switch period. At 0.5 A, the controller locks to a solution in a band having 6 complete rings (1424). At and above 2.0 A, the controller locks to a solution having only a fractional ring. The switch period (1454, 1464, 1474) increases in concert with the switch width and the operation state transitions between bands having ring duration of fractional ring period.

FIG. 15 shows the efficiency of the final switch setting at the termination of the above set of control system steps vs. input current at a range of input and output conditions. While measurement noise exists, there is no evidence of the modulation in efficiency that appears in FIG. 4. Because of the judicious choice of switch period and width of the novel closed loop control system, each point closely represents best efficiency possible with the hardware, near or over 90% across a wide swath, e.g., 1502, of the operating envelope. The pronounced drop in efficiency at 1504 is an artifact of a non-ideal load. This artifact manifests itself at increasing input currents as the output voltage increases.

In some embodiments, the controller may periodically or occasionally, e.g., when a target, input voltage, output voltage, or power vary, or on command, return to a control mode in such a manner to re-optimize the switch settings. In some cases variations in source or load voltage may be enough to make a jump from one band to another favorable. In some such cases, the controller may choose to jump or slew to a new band.

In some embodiments, loops involving perturbations may be performed infrequently to minimize errors or inefficiencies that such perturbations may produce. In some embodiments, perturbations may be applied frequently to maintain high efficiency in spite of rapidly changing inputs or outputs. In some embodiments, perturbations are used to broaden the spectrum of EMI/RFI. In some embodiments, a plurality of good operating conditions are saved and cycled through systematically or randomly to achieve a broadening of the EMI/RFI spectrum.

Method for Developing an Optimal Converter

As used herein, "state" refers to at least one datum that describes an operating condition of a converter. For example a state may include one or more of: an input voltage and current, an output voltage, a switch frequency, a switch period, an input power, an output power, an efficiency, an ambient temperature, a temperature rise, a control-system action, a control-system error, a measurement, a settling time, an offset in switch settings, etc.

Embodiments of the present invention provide a methodology for the characterization and optimization of converter hardware and the development and testing of advanced switch-control algorithms for efficiency optimization over a wide operating envelope. This characterization may allow considerable cost savings by minimizing operating expenses, fully exploiting the capabilities of hardware, avoiding over-designed hardware, etc. This methodology may need performance states that can be the result of simulation, measurement, or a combination. Some preferred embodiments use empirical measurements in realistic or actual circuit layouts to eliminate the potential for model incompleteness, inaccuracy, or errors. Some embodiments of this methodology involve a sequence of phases. An early phase may be "characterization," in which the baseline performance of the converter and safe operating envelope is established through automated testing. Another phase may be "hardware optimization," in which at least one component characteristic is varied in such a manner to improve at least one desirable circuit characteristic, e.g., average efficiency. Another phase may be "optimal performance characterization," in which the control variables, e.g., switch period and width, are swept through a range that is sufficient to include the best-operating points with enough granularity to identify loci or patterns of best-operation. Scans having high granularity are herein called "dense scans." In some embodiments, a programmable load used in this phase is employed in a constant-current, constant-voltage, constant power, constant resistance. By operating a load in an apt mode, the requisite granularity of load setting may be reduced substantially without undue detriment to the fidelity of a switch control method.

A system may be characterized by an input and output voltage and current. A system may alternatively be characterized by three of these parameters and power efficiency. As used herein, each of these characteristics is called a "system parameter." In some embodiments, two system parameters are prescribed, e.g., input and output current, input and output voltage, input voltage and output current, input current and output voltage, input power and output voltage or current, input voltage or current and output power or resistance. At least one of these prescribed system parameters is varied in a scan. In some embodiments two prescribed system parameters are varied in a scan. In some embodiments, one or two "switch parameters," e.g., period and width, may be prescribed and varied in a scan or scans.

In some embodiments a scan of a system or switch parameter is arranged in a loop having a prescribed increment or scale change. In some embodiments, such a parameter is varied to a predetermined or dynamically determined set of values or value. In some embodiments, a plurality of prescribed parameters are arranged in nested loops. In some embodiments, a plurality of prescribed parameters are jointly varied. In some embodiments "design of experiments" considerations are employed to reduce the total scan time. In some embodiments, scan granularity may be enhanced in a "nominal" region of operational interest. In some embodiments, scan granularity may be enhanced at an extremum of a parameter, e.g., to provide enhanced accuracy in subsequent analysis behavior across an operating envelope. A variation of at least one parameter is herein referred to as a composition of scans.

In some embodiments, a non-prescribed parameter of the system is measured in a composition of scans. In some embodiments a non-prescribed parameter is a system parameter or a switch parameter. In some embodiments demonstrated herein, the input current and output current are non-prescribed and therefore measured as an outcome of a set of prescribed states. In some embodiments at least one voltage may be non-prescribed. A judicious choice of prescribed and non-prescribed parameters may take into account the anticipated or intended use and operating envelope of a controller, noise and supply and load regulation, controllability, measurement accuracy, acquisition and communication time, etc.

In some preferred embodiments, this phase may involve saving states to a database or other digital file so that subsequent steps in the methodology can be implemented efficiently in software without the need for time-consuming modeling or experiment. A disadvantage of this approach is that measurement noise is static in this database, which can adversely impact the simulation of control algorithms that may be sensitive to real noise. In some embodiments, simulated noise is added to the stored measurements to produce more realistic control-system inputs. Some embodiments employ measurement averaging to reduce noise levels below that which the control-system would see such that the simulated noise exceeds the noise of the stored measurements.

"Patterns of best operation" may be expressed mathematically as a best period function P and best width function W. For fixed hardware, these functions depend generally depend substantially on three independent parameters describing the input, output, and processed power. In some embodiments, it may be useful to describe these parameters in term of the input voltage ($V_{in}$), input current ($I_{in}$) and output voltage ($V_{out}$). In other embodiments, e.g., for converters intended to be current sources, it may be useful to express these functions in terms of an output current ($I_{out}$) instead of one of the other parameters. It may be most useful for one of the parameters to be a desired control outcome, such as input current or output voltage and for the other variables to be amenable to measurement, communication, or calculation, e.g., $V_{in}$, $V_{out}$. The characterization in this stage may include processing to identify reliably the true best-operation patterns in the presence of measurement noise, to reduce the complexity of the control functions P and W, and analysis to reduce the dimensionality of these functions.

Another phase of this methodology may be to develop a baseline calculation algorithm to approximate the functions P and W. Another phase of this methodology may be to port a calculation algorithm for efficient calculation in a microcontroller, e.g., by transitioning calculations to limited-bit-length fixed-point or reduced accuracy floating-point math and efficient microcontroller operations, such as bit and byte shifts. The efficient algorithms may be tested for consistency with the baseline calculations. Another phase of this methodology may be to port the efficient algorithms to a microcontroller and validate them against the baseline or efficient algorithms running on a computer via a series of remote commands and responses.

Another phase of this methodology may be to seek control signals that can be used to find local or global optima.

Another phase of this methodology may be to devise and test closed-loop control algorithms. In some embodiments these algorithms are tested using previously saved converter measurements with or without additive noise of various levels. Some such control schemes may employ initial switch states or control variables based in part or full on P and W models. Advantages of prototyping control algorithms this approach may include development and computational speed, the ability to add debugging traces and variables in testing, the ability to step through control system code without affecting the operation of a real converter, the absence of damage risks associated with control-system flaws, the ability to run a wide range of test cases automatically, the ability to simulate different amounts of measurement, input, and output noise, etc.

Another phase of this methodology may be to devise and test self-protection calculations, e.g., against excessive power, power dissipation, switch current, switch voltage, transformer current, diode current, diode voltage, PWM period, PWM width, etc. and excessively negative values of ring-durations.

Another phase of this methodology may be to devise a model of the converter efficiency. In some applications, this model may be used to calculate dissipated power. In some applications, this model may be used to infer output properties from input measurements or vice-versa. In some applications, this model may be used as part of an energy-optimization algorithm. In some applications this model may be used to calculate power or current delivered to a load. In some embodiments accurate knowledge of power or current delivered to load is used as part of a power maximizations scheme, e.g., for solar panels or a charge balancing scheme for batteries.

Another phase of this methodology may be to perform automated scans of a control parameter, e.g., input current, output voltage, processed power, and the like, using a virtual converter simulated using previously saved data. In some such scans, the virtual converter uses at least one algorithm developed in this methodology. In some such scans, at least one other parameter is varied, e.g., input voltage, output voltage, output resistance, etc. In some scans, multiple parameters in addition to a control parameter are varied.

Another phase of this methodology may be to perform automated scans of a control parameter using an actual converter and running at least one algorithm developed in this methodology on a control computer. Such scans, herein called "sparse scans" may be useful for testing algorithms and for gathering peak performance data faster than by a dense scan. In some such scans, all states are saved. In other scans only some states are saved. In other scans, states corresponding to converged algorithms are saved. Such scans are herein called "converged scans."

Another phase of this methodology may be to perform automated scans of a control parameter using an actual converter that is utilizing at least one algorithm developed in this methodology. In some scans, one or more parameters other than the control parameter are varied so as to validate the operation over an envelope. In some embodiments, measurements comprising one or more of: efficiency, settling time, settling iterations, initial switch setting error, reported control-system and self-protection errors, estimated efficiency, initial switch settings, etc. Herein, called "hardware scans," these scans may have the advantage of execution speed, since the converter may act as a hardware peripheral that eliminates communication delays that may burden sparse scans and the like.

Another phase of this methodology may be to adjust hardware characteristics, such as resistor, capacitor, and inductor values, transformer turn ratio, rectifier type, and switch type and perform "sparse" scans to identify favorable design changes time effectively.

Another phase of this methodology may be to adjust such hardware characteristics and perform "hardware" scans to identify favorable design changes time effectively. Another phase of this methodology may be to identify parameters associated with hardware combinations that influence calculations. Such parameters are herein called "calibration parameters." Another phase of this methodology may be to develop algorithms and techniques for measuring calibration parameters.

Calibration

As used herein, the term calibration refers to procedure of establishing quantitative variables for use in calculations. The term "self calibration" refers to a procedure wherein an element or elements within the converter perform actions that may include making measurements, adjusting variables, performing calculations, perturbing switch states, scanning through a range or array of switch settings, etc., in order to establish at least one variable. For example, a controller may use a PWM signal to null an offset in a current sensing signal gain circuit. Moreover, such a PWM signal may be employed to dither the current reading to facilitate improved measurement resolution via over-sampling. The PWM setting may be adjusted such that the analog gain circuit output has a target offset voltage. Such schemes may have the advantage of allowing inexpensive op-amp circuits to be used without compromising accuracy. In some embodiments, self calibration requires external hardware, acting passively or in concert.

In some embodiments, external hardware may report information to the converter, e.g., relative or absolute measures of efficiency, output current, output power, input current, input voltage, etc., to facilitate self calibration. In some embodiments, "run-time calibration" refers to the continual, periodic, or occasional update of at least one variable in the course of operation. Run-time calibration may be informed by measurements, communicated data, the action of a control loop, etc. For example, variables used in the calculation of an initial switch setting may be adjusted based on the final switch setting after a closed loop control system settles. In this fashion the converter may learn over a period of time to improve the accuracy and settling time of its control algorithms. Some embodiments may employ "automated external calibration" of at least one variable, in which external apparatus adjusts digital or analog variables used by the converter from observations of the converter behavior. For example, a voltage scale and offset may be externally calibrated by applying two distinct voltages, recording their reported values from the converter, calculating what values of offset and scale would reduce or null discrepancies between reported and actual voltages, and establishing these new values for use in the controller, via, e.g., sending an appropriately coded command packet.

In some embodiments of the invention, at least one calibration parameter is stored in EEPROM, EPROM, FRAM, flash, or ROM. In some embodiments, at least one calibration parameter is stored in RAM, SRAM, DRAM, and the like. In some embodiments, at least one calibration parameter is stored in an analog form, such as a resistance, voltage, current, signal duration, signal frequency, signal duty cycle, etc. In some embodiments, at least one calibration parameter is inferred from real-time actual performance. In some embodiments, at least one calibration parameter is inferred during a self-calibration routine. In some embodiments, at least one parameter is calibrated on reset. In some embodiments, at least one parameter is calibrated on command, e.g., the receipt of a digital packet bearing a coded command, a voltage on a pin, etc.

Some embodiments employ a plurality of such calibration types, reflecting, for example, that some variables are most aptly adjusted in actual operation, some are most aptly adjusted under a controlled input or output, some parameters are substantially static over time and some parameters exhibit drift or depend on input or output characteristics, etc. Likewise some embodiments store different calibration variables in different forms, for example, since some variables may be substantially static and others may vary frequently. Frequently varying variables may be best stored in volatile memory which in some embodiments is backed up to non-volatile memory occasionally, periodically, or on command.

Development Apparatus

Apparatus we developed for optimizing the operating envelope of a converter using the above methodology involved connecting a calibrated programmable power supply to the input of the converter and connecting the output of the converter to a programmable load. Both the supply and load were controlled and monitored for voltages and currents via digital interfaces to a control computer. Converter switch timing was controlled via a hardware peripheral of a microcontroller which had firmware to allow remote control and data reporting via a digital interface to the control computer. The operating efficiency and other parameters were recorded during automated scans of input voltage, output voltage, switch period, and switch width.

The switch-width scans were performed in the innermost loop of this multi-dimensional scan. These width loops were terminated when the total power dissipated within the converter exceeded a limit, when the converter efficiency dropped by an amount from its peak value, when the theoretical ring duration became sufficiently negative, when the calculated peak switch current exceeded a threshold, etc. In some preferred embodiments, these limits are augmented or replaced by measurements or calculations of dissipation in a component-wise or sub-circuit-wise group. For example, in some embodiments, the voltages applied across pins on a switch or diode is compared with safe-operating limits. Such empirical measurements may be further useful for identifying which components consistently limit the operating range and could be changed for less limited devices and which components are over-designed and could be replaced by less expensive devices. In some preferred embodiments, point thermal sensors, e.g., infrared (IR) sensors, thermocouples, diodes, thermistors, heat-flux gauges, etc. are used to detect excessive heating. In some preferred embodiments an IR imaging array is used. In some embodiments the images taken from the thermal array are recorded and analyzed separate from the automated testing. In other embodiments, the images are processed in real-time to provide feedback for the automated scans. Various embodiments use the measured heat flux, temperatures, or image intensities, the change in temperatures or image intensities from a previous measurement, the rate of change of temperatures or image intensities, and combinations of these measurements to provide feedback to the scan and additional data to assist with an understanding of the actual converter function.

In some preferred embodiments, the results of the scans are saved into a digital format to post-processing and analysis. In some preferred embodiments, these scans are performed on a statistically significant number of converters to help establish variability and help identify what variations lead to increased efficiency. In some preferred embodiments, scans are conducted with intentional variation of circuit parameters, e.g., snubber capacitance, snubber resistance, feedback capacitance, switch device characteristics, rectifier characteristics, transformer characteristics, etc. to quantify sensitivities to these parameters and determine circuit modifications that produce a desired characteristic, e.g., improved peak efficiency, improved average efficiency, improved envelope, etc.

Switch controllers according to embodiments of the present invention vary both the width and period of switching in such a manner that a converter operates at a substantially maximal efficiency over a range of input and output parameters. The optimal switch settings may be "calculated" using analog operations or circuitry employing such functions as linear, logarithmic, and exponential amplification, a square-root function, frequency filtering, thresholding, multiplication, rectification, and the like. Some embodiments utilize a digital calculation in the selection of switching parameters, e.g., addition, subtraction, multiplication, division, bit-shift, numerical negation, and, or, xor, logical negation, conditional test, jump table, lookup table, square root, logarithm, exponentiation, raising to a power, etc. Some embodiments combine calculation modes for efficiency, for example an embodiment may comprise a calculation that employs a mathematical operation on a value taken from a lookup table and another value obtained separately, e.g., via another lookup, a calculation, measurement, communication, etc.

Some embodiments comprise a primary calculation of a switch period parameter. Some embodiments additionally comprise a secondary calculation of a switch width parameter that may use a result of a primary calculation. Some embodiments comprise a primary calculation of a switch width parameter. Some embodiments comprise a secondary calculation of a switch period parameter that may use a result of a primary calculation.

Some embodiments change at least one variable in the calculation of an initial switch setting based on a result of a closed-loop control system, for example, knowledge of the magnitude of the error of an initial state may be used to refine the calculations that produced that state such that a subsequent calculation may produce a state having a desirable characteristic, e.g., smaller error, known error sign, etc. Some embodiments change at least one variable in the calculation of an initial switch setting based on the results of a sweep through multiple converter states.

Some embodiments use a condition of minimum sensitivity of current to switch width as a basis of a control. Alternatively, the optimal switch settings may be selected a controller via executing a sweep of switch parameters while obtaining indications of converter efficiency or output characteristics relative to input characteristics via measurement, calculation, inference, communication, and the like.

Also, while a number of specific embodiments were disclosed with specific features, a person of skill in the art will recognize instances where the features of one embodiment can be combined with the features of another embodiment. Also, those skilled in the art will recognize, or be able to ascertain using no more than routine experimentation, many equivalents to the specific embodiments of the inventions described herein. Such equivalents are intended to be encompassed by the following claims.

What is claimed is:

1. A switch controller configured to vary a switch period and a switch width, the switch controller comprising:
   a processing unit; and
   a memory coupled to the processing unit, the memory storing a plurality of instructions executable by the processing unit, the plurality of instructions including instructions to:

receive a first measurement taken on an input side of the switch controller wherein the first measurement comprises an input voltage and an input current;

receive a second measurement taken on an output side of the switch controller wherein the second measurement comprises an output voltage;

calculate an input current parameter based on the input current and the output voltage;

calculate a voltage ratio parameter based on the input voltage, the output voltage, and a transformer winding ratio;

select a band of operation based on the input current parameter;

calculate a slope based on the band of operation and the voltage ratio parameter;

calculate an intercept based on the band of operation and the voltage ratio parameter;

vary the switch period and the switch width based on the slope, the input current parameter, the intercept, and a ring period.

2. The switch controller of claim 1 further includes instructions to calculate an initial switch period and an initial switch width based at least in part on the selected band.

3. The switch controller of claim 1 wherein the processing unit is further configured to slew an initial switch period and an initial switch width to a region corresponding to the selected band.

4. The switch controller of claim 1 further comprising feedback circuitry, wherein the processing unit is further configured to:

calculate a finite difference derivative of a measured value, the measured value resulting from a perturbation of the switch period and the switch width; and generate a control signal based on the finite difference derivative of the measured value.

5. The switch controller of claim 4 wherein the measured value is the input current to the switch controller or the input voltage to the switch controller.

6. The switch controller of claim 4 wherein the perturbation comprises increasing the switch period and decreasing the switch width.

7. The switch controller of claim 4 wherein the perturbation comprises decreasing the switch period and increasing the switch width.

8. The switch controller of claim 1 wherein the band of operation is based on a number of complete ring cycles.

9. The switch controller of claim 1 further comprising a communication peripheral configured to transmit and receive a set of system parameters from an external control device.

10. The switch controller of claim 9 further comprising a communication channel, wherein the communication peripheral is configured to transmit the set of system parameters to the communication channel.

11. The switch controller of claim 9 wherein the set of system parameters includes at least one of the input current, the input voltage, the output voltage, a temperature, a logic voltage, the switch period, the switch width, a finite-difference derivative, a covariance, one or more noise levels, or a root-mean-square variation.

12. A method for controlling a flyback power circuit comprising:

measuring an input current;

measuring an input voltage;

measuring an output voltage;

calculating an input current parameter based on the input current and the output voltage;

calculating a voltage ratio parameter based on a transformer winding ratio, the input voltage, and the output voltage;

selecting a band of operation based on the input current parameter;

calculating a slope based on the band of operation and the voltage ratio parameter;

calculating an intercept based on the band of operation and the voltage ratio parameter; and calculating a switch period based on the slope, the intercept, the input current parameter, and a ring period.

13. The method of claim 12 further comprising:

calculating a switch width based on:

an inductance of a primary side of a transformer;

a switch width offset;

the input current;

the input voltage;

a coefficient based on a circuit loss; and the switch period.

14. The method of claim 12 further comprising:

determining the band of operation based on a number of complete ring periods.

15. The method of claim 12 further comprising:

adjusting a switch property to reach a target parameter;

waiting for a settling time interval;

recording a measurement;

perturbing the switch property;

measuring a system parameter;

calculating an effect of the perturbation by comparing the system parameter with the target parameter;

deriving a control signal from the effect of the perturbation;

selecting the switch period based on the control signal; and selecting a switch width based on the control signal.

16. The method of claim 15 wherein the target parameter includes at least one of the input current, the input voltage, the output voltage, or an output current.

17. The method of claim 15 wherein the switch property includes at least one of the switch width or the switch period.

18. The method of claim 12 further comprising:

receiving one or more of the input current, the input voltage, or the output voltage from a communications peripheral.

* * * * *